(12) United States Patent
Arima et al.

(10) Patent No.: US 11,726,237 B2
(45) Date of Patent: Aug. 15, 2023

(54) LIGHT DIFFUSER PLATE, IMAGE DISPLAY DEVICE, AND LIGHTING DEVICE

(71) Applicant: DEXERIALS CORPORATION, Tokyo (JP)

(72) Inventors: Mitsuo Arima, Tokyo (JP); Masayuki Ishiwata, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 17/273,076

(22) PCT Filed: Sep. 19, 2019

(86) PCT No.: PCT/JP2019/036660
§ 371 (c)(1),
(2) Date: Mar. 3, 2021

(87) PCT Pub. No.: WO2020/059770
PCT Pub. Date: Mar. 26, 2020

(65) Prior Publication Data
US 2021/0325574 A1 Oct. 21, 2021

(30) Foreign Application Priority Data

Sep. 21, 2018 (JP) ................................ 2018-177698
Sep. 17, 2019 (JP) ................................ 2019-168090

(51) Int. Cl.
*G02B 3/04* (2006.01)
*G02B 3/00* (2006.01)
(Continued)

(52) U.S. Cl.
CPC ............ *G02B 3/04* (2013.01); *G02B 3/0043* (2013.01); *G02B 6/0036* (2013.01); *G02F 1/133605* (2013.01)

(58) Field of Classification Search
CPC .................................................. G02B 3/0043
See application file for complete search history.

(56) References Cited

U.S. PATENT DOCUMENTS 5,309,925 A * 5/1994 Policastro ............... A61B 90/04
606/2
2002/0034710 A1 3/2002 Morris et al.
(Continued)

FOREIGN PATENT DOCUMENTS

CN 1743899 A 3/2006
CN 108139512 A 6/2018
(Continued)

OTHER PUBLICATIONS

Mar. 7, 2022, Chinese Office Action issued for related CN Application No. 201980050820.2.
(Continued)

*Primary Examiner* — Fatima N Farokhrooz
(74) *Attorney, Agent, or Firm* — Paratus Law Group, PLLC

(57) ABSTRACT

To provide a light diffuser plate that can control an anisotropic shape of diffused light. The light diffuser plate includes a base material, and a group structure including a plurality of convexities or concavities provided on at least one main surface of the base material and having anisotropic shapes extended in a common direction. The plurality of convexities or concavities are arranged randomly and densely on the main surface of the base material. A boundary between adjacent ones of the plurality of convexities or concavities includes a plurality of curved lines having curvatures different from each other.

11 Claims, 39 Drawing Sheets

(51) Int. Cl.
*F21V 8/00* (2006.01)
*G02F 1/13357* (2006.01)

(56) References Cited

U.S. PATENT DOCUMENTS

| | | | | |
|---|---|---|---|---|
| 2007/0291369 | A1* | 12/2007 | Shimura | G02B 6/0053 359/619 |
| 2010/0039808 | A1* | 2/2010 | Purchase | G09F 13/0409 359/599 |
| 2015/0138487 | A1* | 5/2015 | Hirayama | G02B 5/0257 362/606 |
| 2017/0184954 | A1 | 6/2017 | Koyanagi et al. | |
| 2018/0284326 | A1* | 10/2018 | Arima | F21V 5/004 |
| 2019/0369297 | A1* | 12/2019 | Arima | F21V 3/00 |

FOREIGN PATENT DOCUMENTS

| | | | | |
|---|---|---|---|---|
| EP | 2916149 | A1 | 9/2015 | |
| JP | 2006-072370 | A | 3/2006 | |
| JP | 2007-173035 | A | 7/2007 | |
| JP | 2007173035 | A * | 7/2007 | F21V 5/004 |
| JP | 4638815 | B2 | 2/2011 | |
| JP | 2013-097876 | A | 5/2013 | |
| JP | 2015-169804 | A | 9/2015 | |
| JP | 2017068216 | A * | 4/2017 | F21V 3/049 |
| WO | WO-2016163125 | A1 * | 10/2016 | G02B 3/00 |
| WO | WO 2017/057744 | A1 | 4/2017 | |
| WO | WO 2017/073251 | A1 | 5/2017 | |
| WO | WO 2018/123466 | A1 | 7/2018 | |

OTHER PUBLICATIONS

Apr. 20, 2022, European Search Report issued for related EP Application No. 19862579.0.
Nov. 11, 2022, Chinese Office Action issued for related CN Application No. 201980050820.2.
Apr. 6, 2023, Chinese Office Action issued for related CN Application No. 201980050820.2.

* cited by examiner

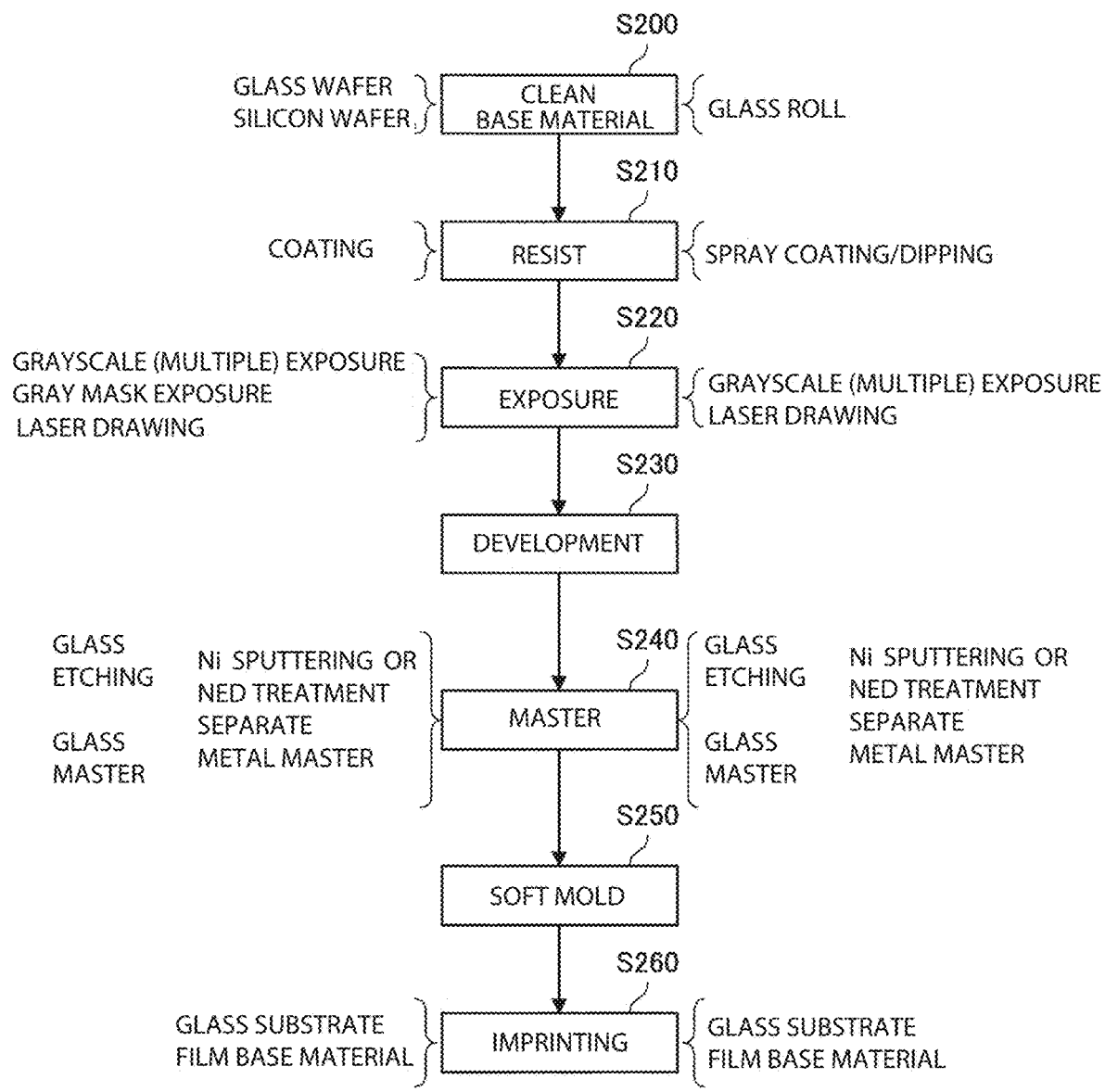

FIG. 21
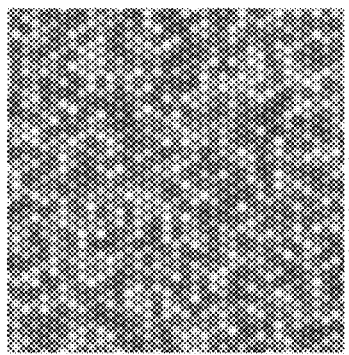
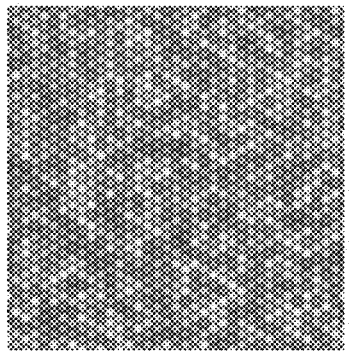
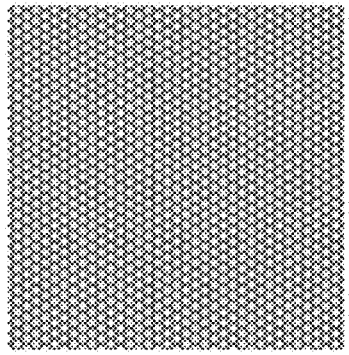
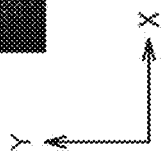

LIGHT DIFFUSER PLATE, IMAGE DISPLAY DEVICE, AND LIGHTING DEVICE

CROSS REFERENCE TO PRIOR APPLICATION

This application is a National Stage Patent Application of PCT International Patent Application No. PCT/JP2019/036660 (filed on Sep. 19, 2019) under 35 U.S.C. § 371, which claims priority to Japanese Patent Application Nos. 2018-177698 (filed on Sep. 21, 2018) and 2019-168090 (filed on Sep. 17, 2019) which are all hereby incorporated by reference in their entirety.

TECHNICAL FIELD

The present invention relates to a light diffuser plate, an image display device, and a lighting device.

BACKGROUND ART

A light diffuser plate that scatters incoming light to various directions is widely utilized in various devices, for example, a display device such as a display, a projection device such as a projector, and various types of lighting devices. An incoming light diffusing mechanism in this diffuser plate is roughly classified into a mechanism that utilizes light refraction resulting from the surface shape of the light diffuser plate and a mechanism that utilizes scattering by a substance existing inside a bulk body and having a different refractive index from the circumference. One of the light diffuser plates which utilize the light refraction resulting from the surface shape is what is called a microlens array light diffuser plate.

A light diffusion component as disclosed in Patent Literature 1 below, for example, is known as such a microlens array light diffuser plate.

CITATION LIST

Patent Literature

Patent Literature 1: JP 2013-97876A

SUMMARY OF INVENTION

Technical Problem

However, Patent Literature 1 and the like do not particularly consider the shape of light after diffusion through the light diffuser plate. In the meanwhile, as a wider variety of devices utilize a light diffuser plate in recent years, the shape of a projection surface on which light diffused through the light diffuser plate is projected is also diversified.

Thus, there has been an increasing request for controlling the shape of light after diffusion through the light diffuser plate in conformity with the shape of a projection surface to use the light after diffusion through the light diffuser plate more efficiently.

The present invention was therefore made in view of the above circumstances, and the present invention has an object to provide a light diffuser plate that is novel and improved, and enables an anisotropic shape of diffused light to be controlled, as well as an image display device and a lighting device in which the light diffuser plate is used.

Solution to Problem

In order to achieve the above-mentioned object, according to a certain aspect of the present invention, there is provided a light diffuser plate including a base material, and a group structure including a plurality of convexities or concavities provided on at least one main surface of the base material and having anisotropic shapes extended in a common direction. The plurality of convexities or concavities are arranged randomly and densely on the main surface of the base material. A boundary between adjacent ones of the plurality of convexities or concavities includes a plurality of curved lines having curvatures different from each other.

Surfaces of the convexities or concavities may include curved surfaces.

Surface shapes of the convexities or concavities may be anamorphic shapes or torus shapes.

The plurality of convexities or concavities may be arranged such that radii of curvature or opening sizes of curved surfaces of the plurality of convexities or concavities are perturbed from each other.

When expressing a perturbed amount of the radius of curvature of the curved surface of each of the plurality of convexities or concavities by $\Delta R$, and a reference value of the radius of curvature of the curved surface by R, $\Delta R/R$ may be more than or equal to 3% and less than or equal to 85%.

When expressing a perturbed amount of the opening size of each of the plurality of convexities or concavities by $\Delta D$, and a reference value of the opening size by D, $\Delta D/D$ may be more than or equal to 3% and less than or equal to 85%.

An optical phase difference component $\Psi$ of the group structure with respect to light having a wavelength of more than or equal to 0.35 μm and less than or equal to 2 μm may be less than 150.

A phase difference dispersion $\sigma(\Psi)$ of the group structure with respect to light having a wavelength of more than or equal to 0.35 μm and less than or equal to 2 μm may be less than 200.

A filling rate of the convexities or concavities on the main surface of the base material may be more than or equal to 90%.

When expressing a half width of a light distribution angle of the group structure in the extending direction of the anisotropic shapes by WL, and a half width of a light distribution angle of the group structure in a direction orthogonal to the extending direction by WO, WO/WL may be more than or equal to 1.05.

The boundary between adjacent ones of the plurality of convexities or concavities may have a width of less than or equal to 1 μm.

In addition, in order to achieve the above-mentioned object, according to another aspect of the present invention, there is provided an image display device including a light diffuser plate mounted on an optical path from a light source, in which the light diffuser plate includes a base material, and a group structure including a plurality of convexities or concavities provided on at least one main surface of the base material and having anisotropic shapes extended in a common direction. The plurality of convexities or concavities are arranged randomly and densely on the main surface of the base material. A boundary between adjacent ones of the plurality of convexities or concavities includes a plurality of curved lines having curvatures different from each other.

In addition, in order to achieve the above-mentioned object, according to another aspect of the present invention, there is provided a lighting device including a light diffuser plate mounted on a surface of a light source, in which the light diffuser plate includes a base material, and a group structure including a plurality of convexities or concavities provided on at least one main surface of the base material and having anisotropic shapes extended in a common direction. The plurality of convexities or concavities are arranged randomly and densely on the main surface of the base material. A boundary between adjacent ones of the plurality of convexities or concavities includes a plurality of curved lines having curvatures different from each other.

With the above configuration, each of the plurality of convexities or concavities has an anisotropic shape in a common direction, so that anisotropy can be provided for the light distribution angle of diffused light diffused through a light diffuser plate.

Advantageous Effects of Invention

According to the present invention as described above, an anisotropic shape of diffused light can be controlled in the light diffuser plate.

BRIEF DESCRIPTION OF DRAWINGS

FIG. 13 is a flowchart illustrating an exemplary flow of a method of manufacturing a light diffuser plate according to the present embodiment;

FIG. 21 illustrates images of generated pattern data of light diffuser plates according to Comparative examples 1 to 3, and simulation results of light distribution obtained by electromagnetic field analyses;

DESCRIPTION OF EMBODIMENTS

Figure 1:
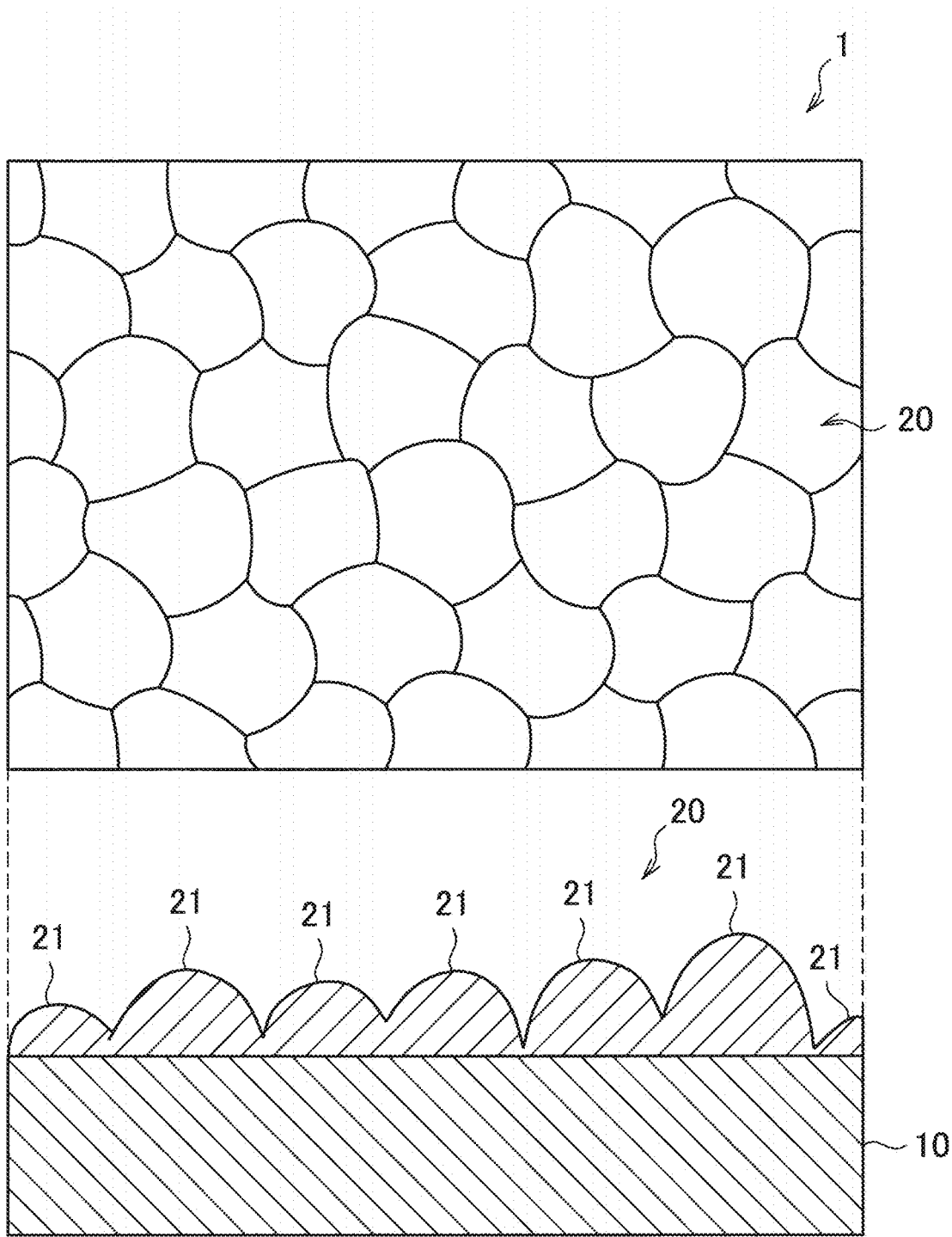
FIG. 1 is an explanatory diagram schematically illustrating a configuration of a light diffuser plate according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Light Diffuser Plate>

Figure 2:
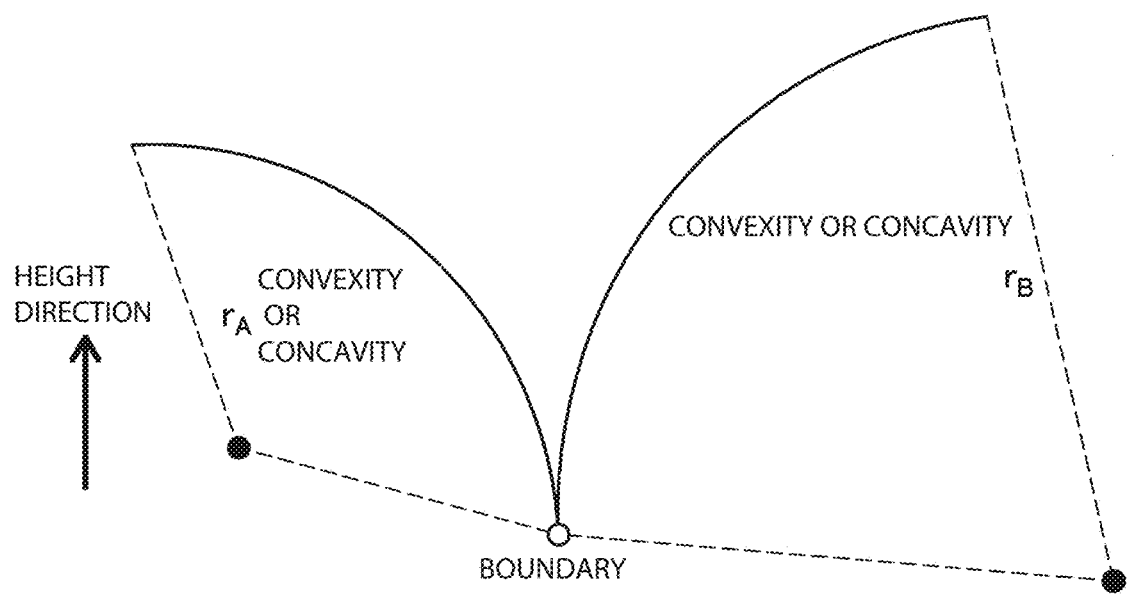
FIG. 2 is an enlarged explanatory diagram of and around a boundary between convexities of the light diffuser plate according to the embodiment.
Figure 3:
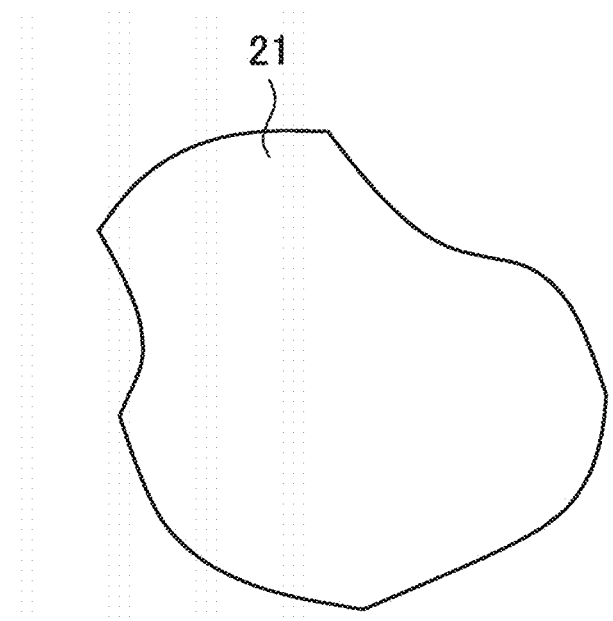
FIG. 3 is an explanatory diagram schematically illustrating a contour of a convexity when viewed in plan view in a direction perpendicular to one main surface of a base material.

First, a light diffuser plate according to an embodiment of the present invention will be described with reference to FIG. 1 to FIG. 3. FIG. 1 is an explanatory diagram schematically illustrating a configuration of a light diffuser plate 1 according to the present embodiment. In addition, FIG. 2 is an enlarged explanatory diagram of and around the boundary between convexities 21 of the light diffuser plate 1 according to the present embodiment, and FIG. 3 is an explanatory diagram schematically illustrating a contour of the convexity 21 when viewed in plan view in a direction perpendicular to one main surface of a base material 10.

As illustrated in FIG. 1, the light diffuser plate 1 according to the present embodiment includes the base material 10 and a group structure 20. The light diffuser plate 1 according to the present embodiment is a microlens array light diffuser plate in which the group structure 20 is a microlens array.

The base material 10 is made from a material that can be regarded as transparent in a wavelength band of light incident upon the light diffuser plate 1.

For example, the base material 10 may be made from a material whose light transmittance is more than or equal to 70% in a wavelength band corresponding to visible light. In addition, the base material 10 may have a film-like shape, or may have a plate-like shape. In FIG. 1, the base material 10 is provided in a rectangular planar shape, whilst the light diffuser plate 1 according to the present embodiment is not limited to such an illustration. The planar shape of the base material 10 may be an arbitrary shape in accordance with the shape of a device in which the light diffuser plate 1 is mounted.

The base material 10 may be made from a publicly known transparent resin such as, for example, polymenthyl methacrylate (PMMA), polyethylene terephthalate (PET), polycarbonate (PC), or cyclo olefin copolymer (COC), or may be made from a publicly known optical glass such as quartz glass, borosilicate glass, or highly transparent glass.

The group structure 20 is provided on at least one main surface of the base material 10. The group structure 20 is a group of fine convexities 21 or concavities, and the group structure 20 includes the plurality of convexities 21 or concavities. The plurality of convexities 21 or concavities are arranged finely, continuously, and randomly on at least one main surface of the base material 10. Each of the convexities 21 or concavities has a surface shape including a curved surface, and constitutes a single lens of the microlens array. In the present embodiment, as illustrated in FIG. 1, an example in which the plurality of convexities 21 are formed on one main surface (front surface) of the base material 10 will be described, whilst the plurality of convexities 21 or concavities may be formed on both the main surfaces (front and rear surfaces) of the base material 10. In addition, hereinafter, an example in which a plurality of single lenses constituting the group structure 20 are implemented by the plurality of convexities 21 will be mainly described, whilst the present invention is not limited to such an example. For example, the plurality of single lenses constituting the group structure may be implemented by a plurality of concavities.

In the group structure 20, the plurality of convexities 21 are arranged densely as schematically illustrated in FIG. 1, and preferably are arranged minutely densely (that is, finely). In other words, in the group structure 20, the plurality of convexities 21 are arranged to be continuous to each other such that a flat part does not exist at the boundary between adjacent ones of the convexities 21. In actual manufacturing, however, the vicinity of an inflection point of the boundary between the convexities 21 may become generally flat since curved surfaces are connected continuously. In such a case, at the boundary between the convexities 21, the width of the vicinity of the inflection point (the width of the boundary line) which becomes generally flat preferably is less than or equal to 1 μm.

In the light diffuser plate 1 according to the present embodiment, a zero-order transmitted light component of incoming light that is transmitted through the surface of the light diffuser plate without scattering can be reduced by arranging the convexities 21 densely with no gap between each other on the base material 10. Accordingly, in the light diffuser plate 1, light diffusion performance can be improved further. At this time, the filling rate of the convexities 21 on the base material 10 preferably is more than or equal to 90%, and more preferably is 100%. Herein, the filling rate is the area proportion of a portion occupied by the plurality of convexities 21 or concavities on the main surface of the base material 10.

In addition, in the group structure 20, the plurality of convexities 21 are arranged randomly (irregularly) rather than regularly, as schematically illustrated in FIG. 1. Herein, the term "randomly" indicates that no substantial regularity exists in the arrangement of the convexities 21 in an arbitrary region of the group structure 20 of the light diffuser plate 1. Even if some regularity exists in the arrangement of the convexities 21 in a minute region, an arbitrary region as a whole having no regularity in the arrangement of the convexities 21 shall be included in the case of "irregularly". Note that a method of arranging the convexities 21 randomly in the light diffuser plate 1 according to the present embodiment will be described later.

The shape of the convexities 21 or concavities is not particularly limited as long as the convexities 21 or concavities function as single lenses (microlenses). For example, the three-dimensional shape of the convexities 21 or concavities may be formed by curved surfaces only including spherical components, or may be formed by curved surfaces including aspherical components. In addition, the three-dimensional shape of the convexities 21 or concavities may be convex or concave with respect to the main surface of the base material 10.

In addition, in the group structure 20 of the light diffuser plate 1 according to the present embodiment, the convexities 21 may each vary randomly not only in arrangement, but also in opening size and radius of curvature. Note that since the convexities 21 or concavities function as single lenses (microlenses), the opening size of the convexity 21 or concavity is equivalent to the lens diameter of the single lens. The surface of the convexity 21 or concavity includes a curved surface. The phase distribution of an optical aperture of each of the convexities 21 varies depending on the orientation. By arranging the plurality of convexities 21 randomly in a manner overlapping each other on the main surface of the base material 10, and varying the opening size (lens diameter) and radius of curvature of each of the convexities 21, the contours of the plurality of convexities 21 do not have an identical shape to each other. Accordingly, the plurality of convexities 21 have various shapes as schematically illustrated in FIG. 1, and thus many of them do not have symmetry.

Specifically, in the group structure 20 according to the present embodiment, the plurality of convexities 21 may be provided randomly and densely such that the radii of curvature or opening sizes of the curved surfaces of the respective convexities 21 are perturbed from each other. For example, when expressing the perturbed amount of the radius of curvature of the curved surface of each of the convexities 21 by $\Delta R$ and the reference value of the radius of curvature of the curved surface by R, $\Delta R/R$ preferably is more than or equal to 3% and less than or equal to 85%. In other words, the radius of curvature of the curved surface of each of the convexities 21 may vary in a range of values obtained by perturbing the reference value R by more than or equal to 3% and less than or equal to 85%. In addition, when expressing the perturbed amount of the opening size of the curved surface of each of the convexities 21 by $\Delta D$ and the reference value of the opening size of the curved surface by D, $\Delta D/D$ preferably is more than or equal to 3% and less than or equal to 85%. In other words, the opening size of the curved surface of each of the convexities 21 may vary in a range of values obtained by perturbing the reference value D by more than or equal to 3% and less than or equal to 85%.

Note that perturbation means a deviation from a predetermined reference value. In this manner, in the group structure 20 according to the present embodiment, since the surface shapes and arrangement of the respective convexities 21 vary randomly, the radius of curvature and opening size of the curved surface constituting each of the convexities 21 are deviated (perturbed) randomly from the reference values R and D, respectively, within predetermined ranges.

In such a case, a situation in which the radius of curvature of a convex or concavity A is $r_A$, while the radius of curvature of an adjacent convex or concavity B is $r_B$ ($\neq r_A$) occurs as illustrated in FIG. 2. In a case where the convexities 21 adjacent to each other have radii of curvature different from each other, the boundary between the convexities 21 adjacent to each other includes not only a straight line alone, but also a curved line at least partially.

Specifically, as schematically illustrated in FIG. 3, in a case of viewing the convexity 21 in plan view in the direction perpendicular to one main surface of the base material 10, the contour of the convexity 21 (the boundary line between the convexity 21 and adjacent other convexities 21) includes a plurality of curved lines having curvatures different from each other. In the case where the boundaries between the convexities 21 include a plurality of curved lines having curvatures different from each other, regularity of the boundaries between the convexities 21 is lowered further, and the diffraction component of diffused light can therefore be reduced further in the light diffuser plate 1.

Furthermore, the group structure 20 of the light diffuser plate 1 according to the present embodiment is configured by randomly and densely arranging the convexities 21 having anisotropy in a common direction throughout the group structure 20. Specifically, the group structure 20 is configured by randomly and finely arranging the convexities 21 having a planar shape whose length in one direction (also called the longitudinal direction) is longer than the length in another direction (also called a shorter side direction) orthogonal to the one direction such that the longitudinal direction of each of the convexities 21 extends in the same direction. Accordingly, the light diffuser plate 1 according to the present embodiment can control the anisotropic shape of diffused light on a projection surface. Specifically, in the light diffuser plate 1, a light diffusion width in the longitudinal direction of the convexities 21 is reduced, and a light diffusion width in the shorter side direction orthogonal to the longitudinal direction of the convexities 21 is increased. Accordingly, the anisotropic shape of light diffused through the light diffuser plate 1 can be controlled in conformity with the shape of the projection surface.

Note that in a case where anisotropy of the planar shape of the convexities 21 arranged randomly and densely is small, some of the convexities 21 may no longer have anisotropy of the planar shape depending on the degree of overlap between the convexities 21. Even in such a case, some of the convexities 21 maintain anisotropy of the planar shape, and the group structure 20 as a whole has anisotropy, so that the light diffuser plate 1 can control the anisotropic shape of diffused light on the projection surface.

Hereinafter, the convexities 21 having such anisotropy will be described more specifically.

<2. Convexity>
(2.1. Shape of Convexity)

First, the individual shape of the convexity 21 will be described with reference to FIG. 4A to FIG. 6. The convexity 21 has a three-dimensional shape extended in a predetermined direction and having anisotropy. For example, the shape of the convexity 21 may be either a first shape example or a second shape example which will be described below.

(First Shape Example)

The first shape example (anamorphic shape) of the convexity 21 will be described with reference to FIG. 4A to FIG. 4E.

Figure 4A:
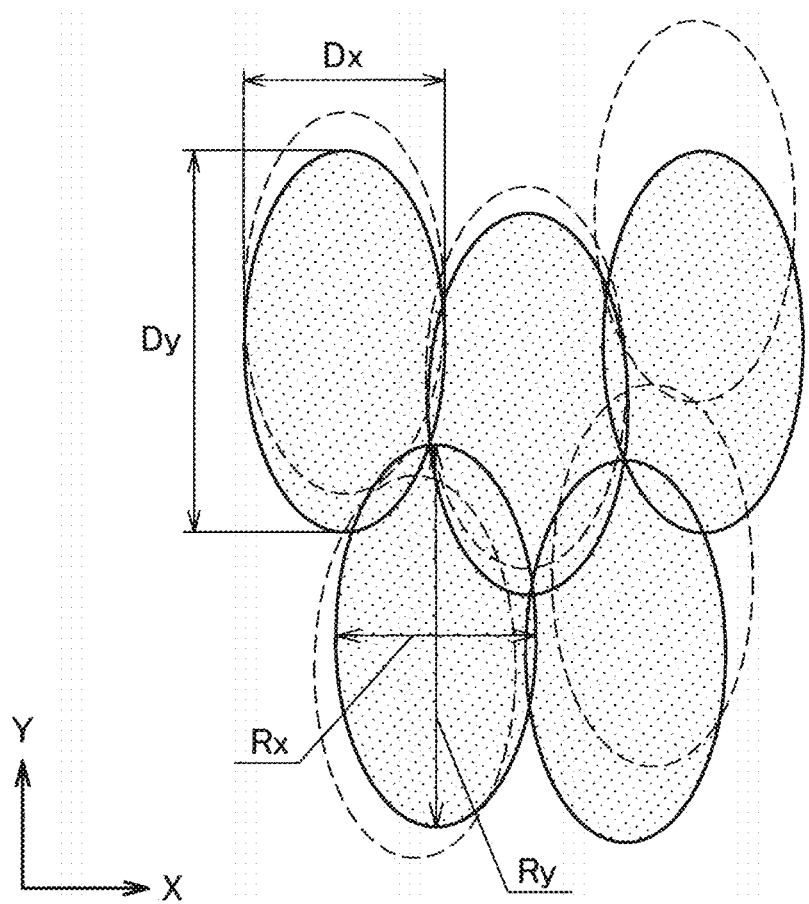
FIG. 4A is an explanatory diagram illustrating a planar shape of convexities according to a first shape example.
Figure 4B:
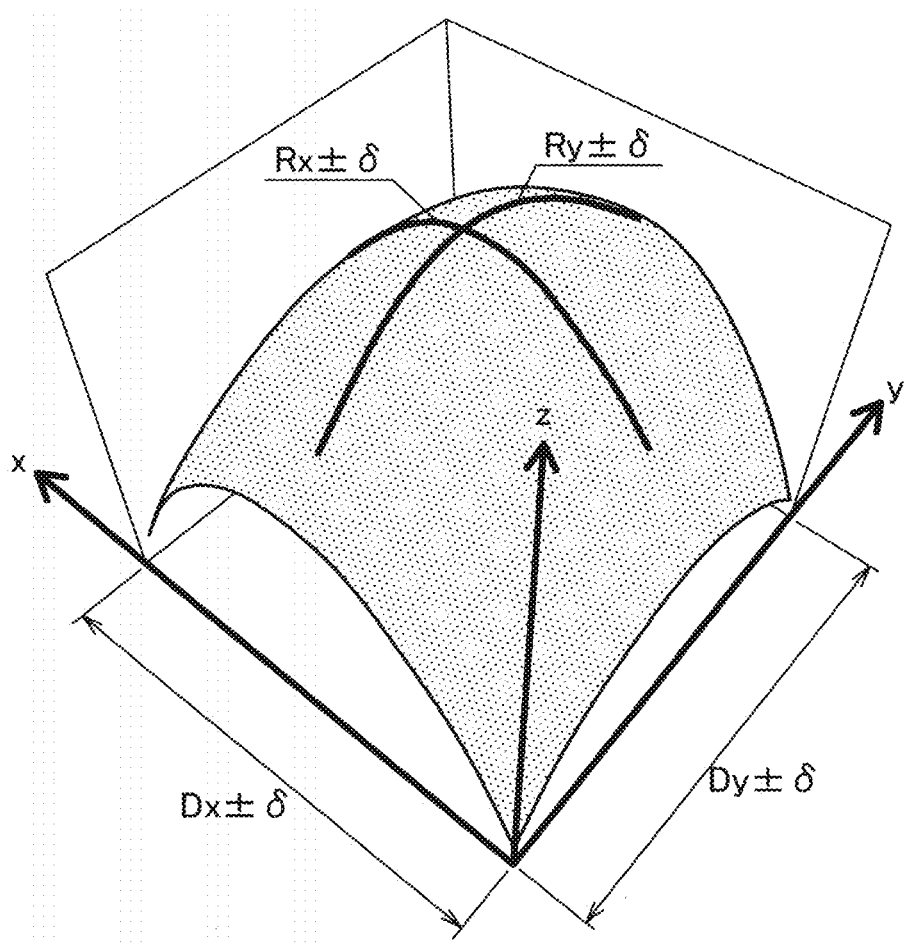
FIG. 4B is a perspective view illustrating a three-dimensional shape of a convexity according to the first shape example.
Figure 4C:
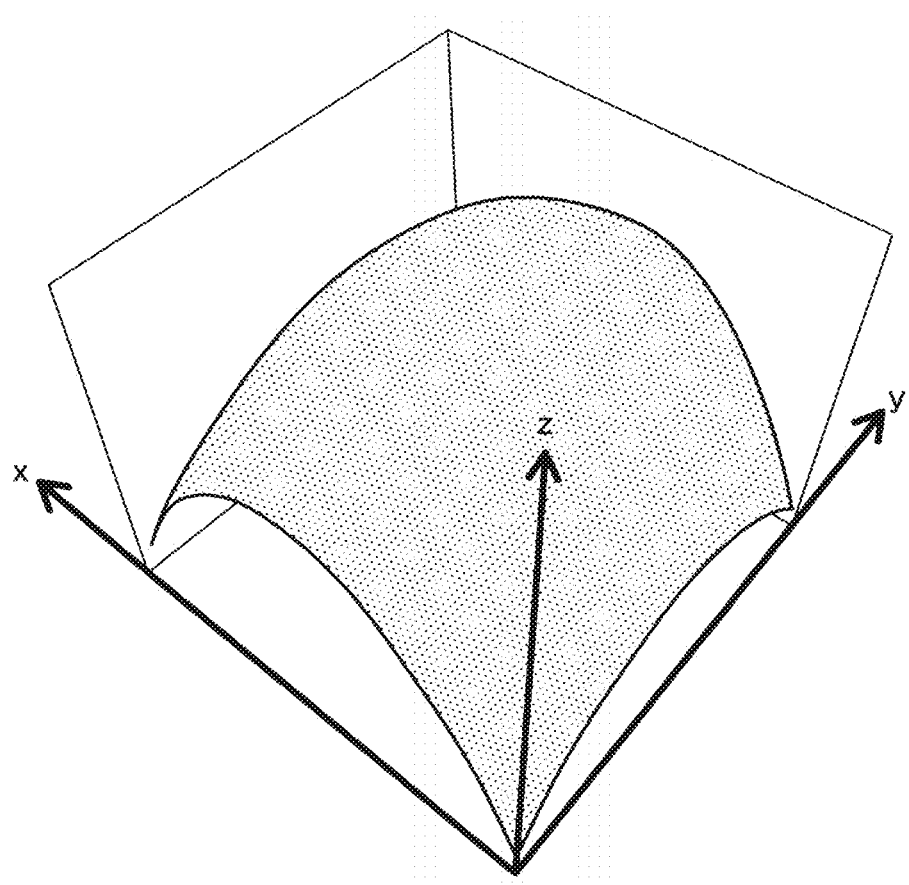
FIG. 4C is an explanatory diagram illustrating a method of determining the three-dimensional shape of a convexity according to the first shape example.
Figure 4D:
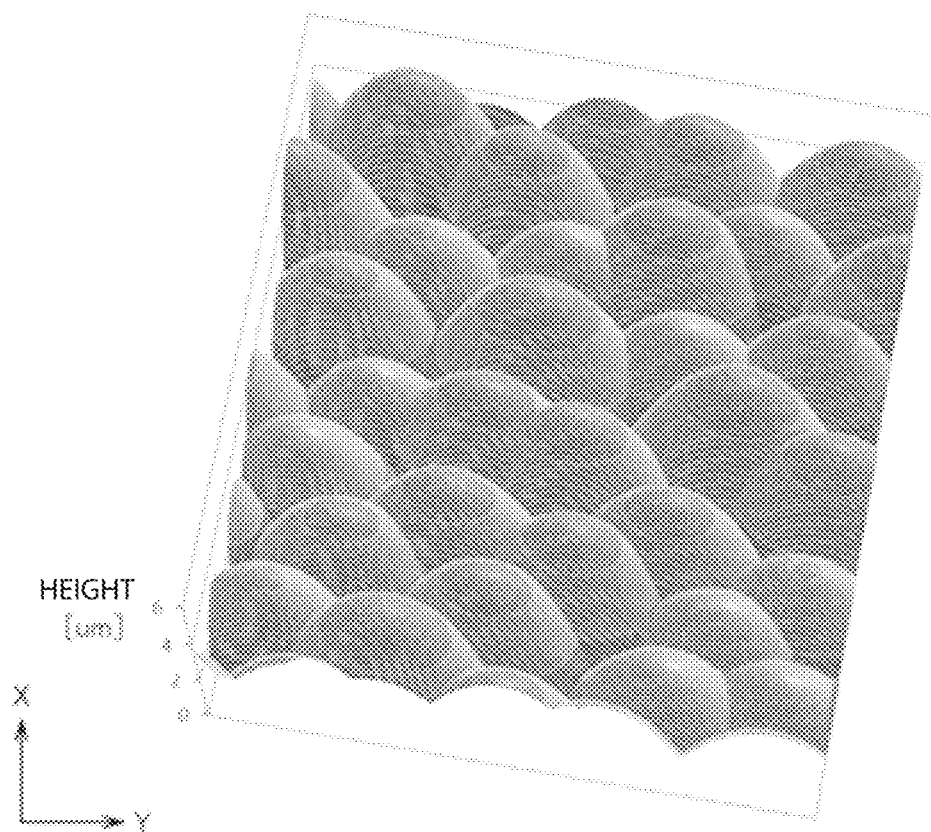
FIG. 4D is an image view illustrating an exemplary group structure obtained by finely and randomly arranging convexities according to the first shape example through a simulation.
Figure 4E:
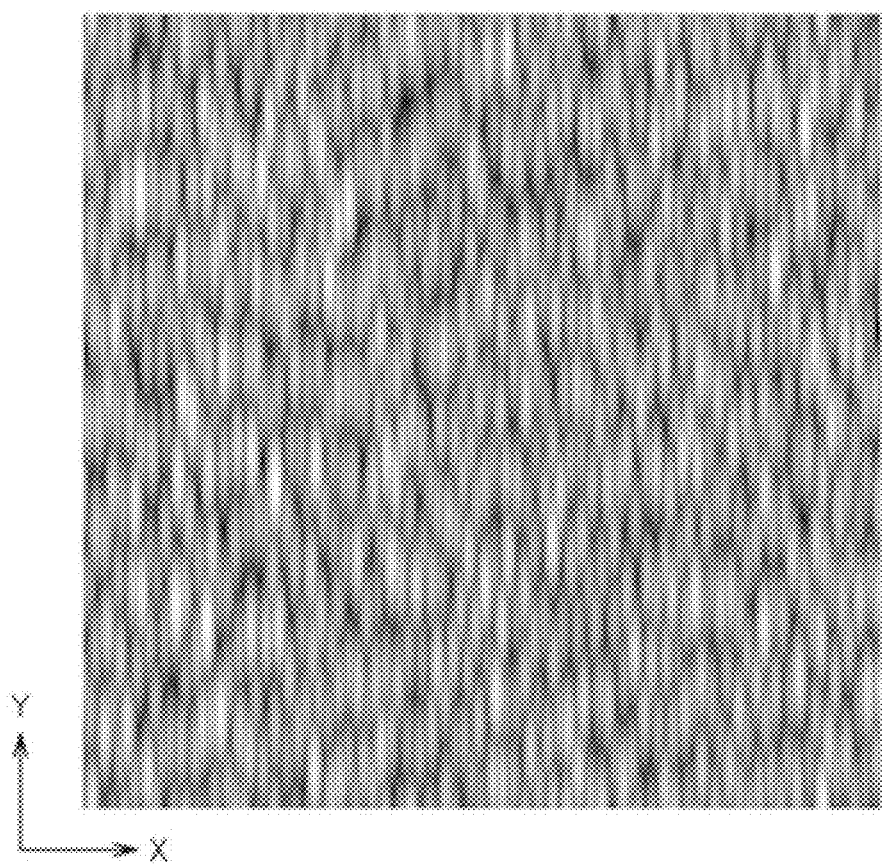
FIG. 4E is an image view illustrating an example in which the group structure obtained by finely and randomly arranging the convexities according to the first shape example is observed with a laser microscope at 20× magnification.

FIG. 4A is an explanatory diagram illustrating a planar shape of the convexity 21 according to the first shape example, and FIG. 4B is a perspective view illustrating the three-dimensional shape of the convexity 21 according to the first shape example. FIG. 4C is an explanatory diagram illustrating a method of determining the three-dimensional shape of the convexity 21 according to the first shape example. In addition, FIG. 4D is an image view illustrating an example of the group structure 20 obtained by arranging the convexities 21 according to the first shape example finely and randomly through a simulation, and FIG. 4E is an image view illustrating an example in which the group structure 20 obtained by arranging the convexities 21 according to the first shape example finely and randomly is observed with a laser microscope at 20× magnification.

As illustrated in FIG. 4A and FIG. 4B, the convexity 21 according to the first shape example has an elliptical planar shape, and may have a three-dimensional shape that is convex in each of the longer axis direction and the shorter axis direction of the elliptical shape with a curved surface having a predetermined radius of curvature. In other words, the convexity 21 according to the first shape example may have what is called an anamorphic lens shape. The convexity 21 having the anamorphic shape according to the first shape example is formed by a curved surface including an anamorphic curved surface.

Specifically, the planar shape of the convexity 21 according to the first shape example is an elliptical shape having anisotropy whose length along the longer axis is Dy and length along the shorter axis is Dx. In addition, the three-dimensional shape of the convexity 21 according to the first shape example is a curved convex shape whose radius of curvature in the longer axis direction is Ry and radius of curvature in the shorter axis direction is Rx. Therefore, the convexity 21 according to the first shape example is a three-dimensional shape having anisotropy in the Y-axis direction.

More specifically, the three-dimensional shape of the convexity 21 according to the first shape example may be determined by cutting out the curved shape of the convexity 21 from an elliptical shape illustrated in FIG. 4C and determined by Expression 1 below such that the length in the X-axis direction is Dx and the length in the Y-axis direction is Dy. Note that in Expression 1, Cx=1/Rx and Cy=1/Ry hold. Kx and Ky are conic coefficients, and A4 and A6 are aspherical coefficients.

[Ex. 1]

$$Z = \frac{C_x x^2 - C_y y^2}{1 + \sqrt{1 - (1+K_x)C_x^2 x^2 - (1+K_y)C_y^2 y^2}} + A_4 x^4 + A_6 x^6 \quad (1)$$

Herein, in the convexities 21 according to the first shape example, the longer axis length Dy, the shorter axis length Dx, the radius of curvature Ry in the longer axis direction, and the radius of curvature Rx in the shorter axis direction of the elliptical shape vary under a perturbation at a perturbation rate δ in each of the convexities 21. The perturbation rate δ may be more than or equal to 3% and less than or equal to 85%, for example. In a case where the perturbation rate δ is more than or equal to 3%, the shape of each of the convexities 21 is less likely to have symmetry, so that the diffraction component of diffused light through the light diffuser plate 1 can be reduced further. On the other hand, in a case where the perturbation rate δ is less than or equal to 85%, the shape of each of the convexities 21 does not vary excessively, so that diffused light through the light diffuser plate 1 can be less likely to become uneven.

FIG. 4D illustrates an image example of the group structure 20 obtained by arranging the convexities 21 according to this first shape example finely and randomly through a simulation. As illustrated in FIG. 4D, it is understood that in the group structure 20 obtained by arranging the convexities 21 according to the first shape example through a simulation, the convexities 21 having anisotropy in the Y-axis direction are arranged finely and randomly. It is also understood that in the group structure 20 illustrated in FIG. 4D, the respective convexities 21 do not have an identical shape to each other, but have asymmetric shapes.

In addition, FIG. 4E illustrates a laser microscopic image example of the group structure 20 obtained by actually arranging the convexities 21 according to the first shape example finely and randomly. As illustrated in FIG. 4E, it is understood that in the group structure 20 obtained by actually arranging the convexities 21 according to the first shape example, the convexities 21 having anisotropy in the Y-axis direction are arranged finely and randomly similarly to the simulation result illustrated in FIG. 4D.

(Second Shape Example)

Next, a second shape example (torus shape) of the convexities 21 will be described with reference to FIG. 5A to FIG. 5E.

Figure 5A:
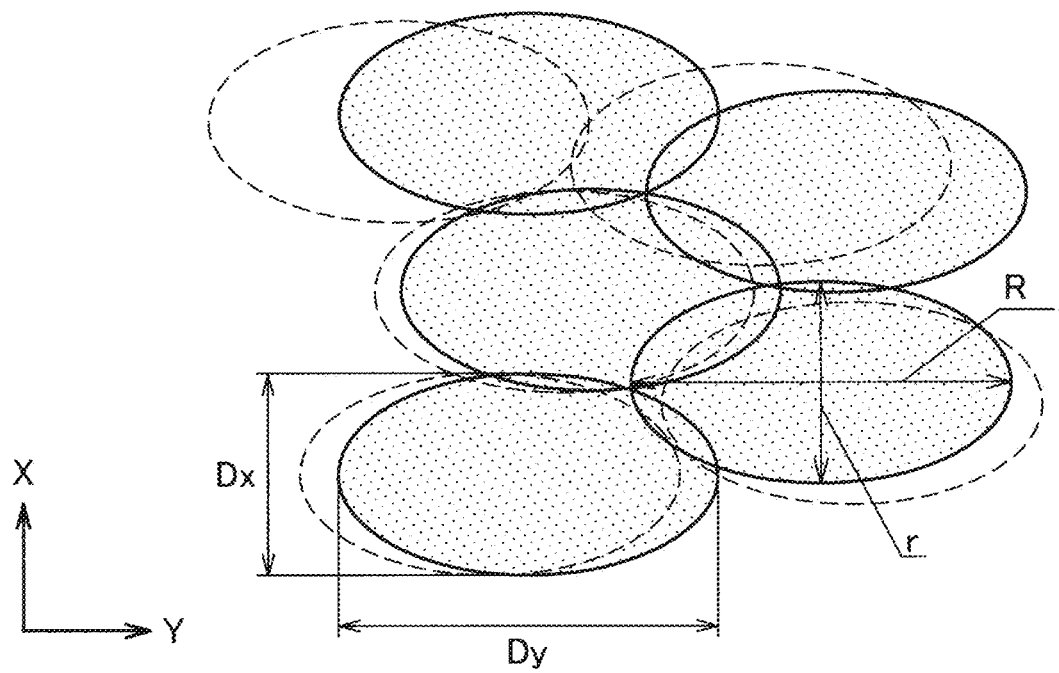
FIG. 5A is an explanatory diagram illustrating a planar shape of convexities according to a second shape example.
Figure 5B:
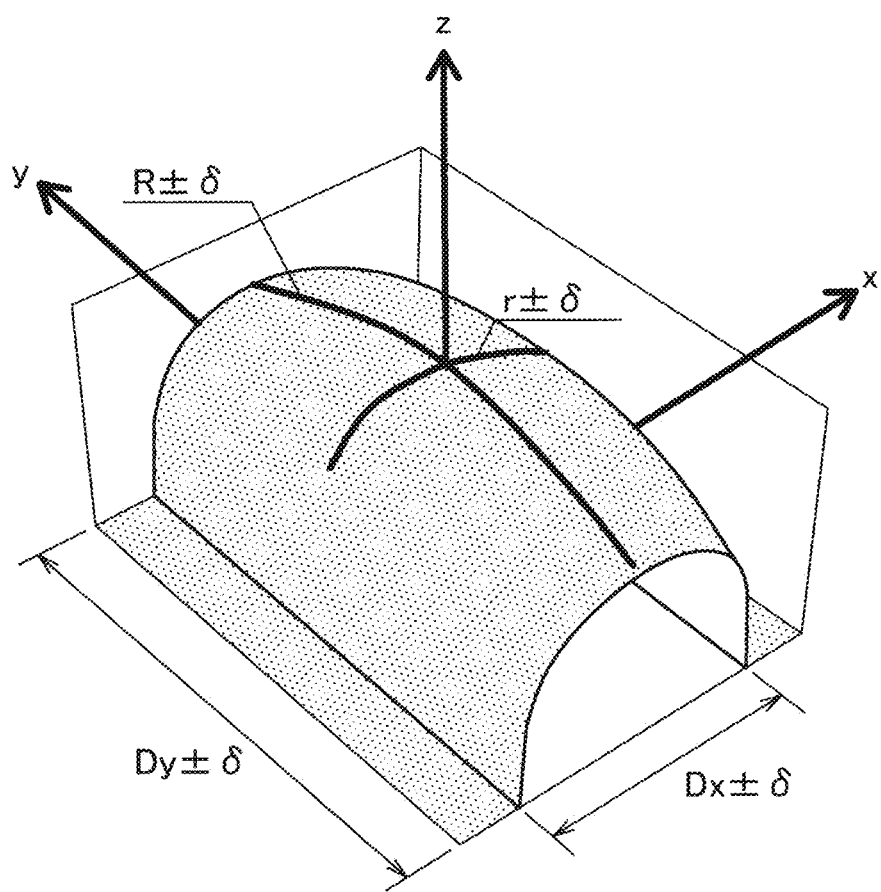
FIG. 5B is a perspective view illustrating a three-dimensional shape of a convexity according to the second shape example.
Figure 5C:
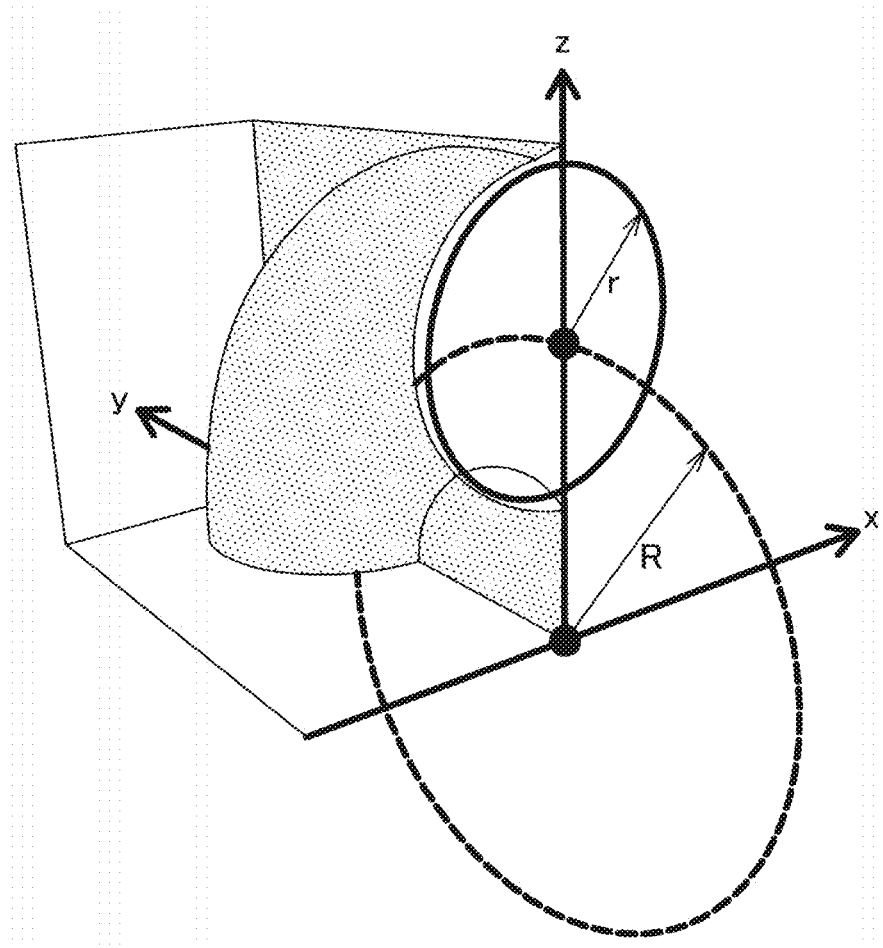
FIG. 5C is an explanatory diagram illustrating a method of determining the three-dimensional shape of a convexity according to the second shape example.
Figure 5D:
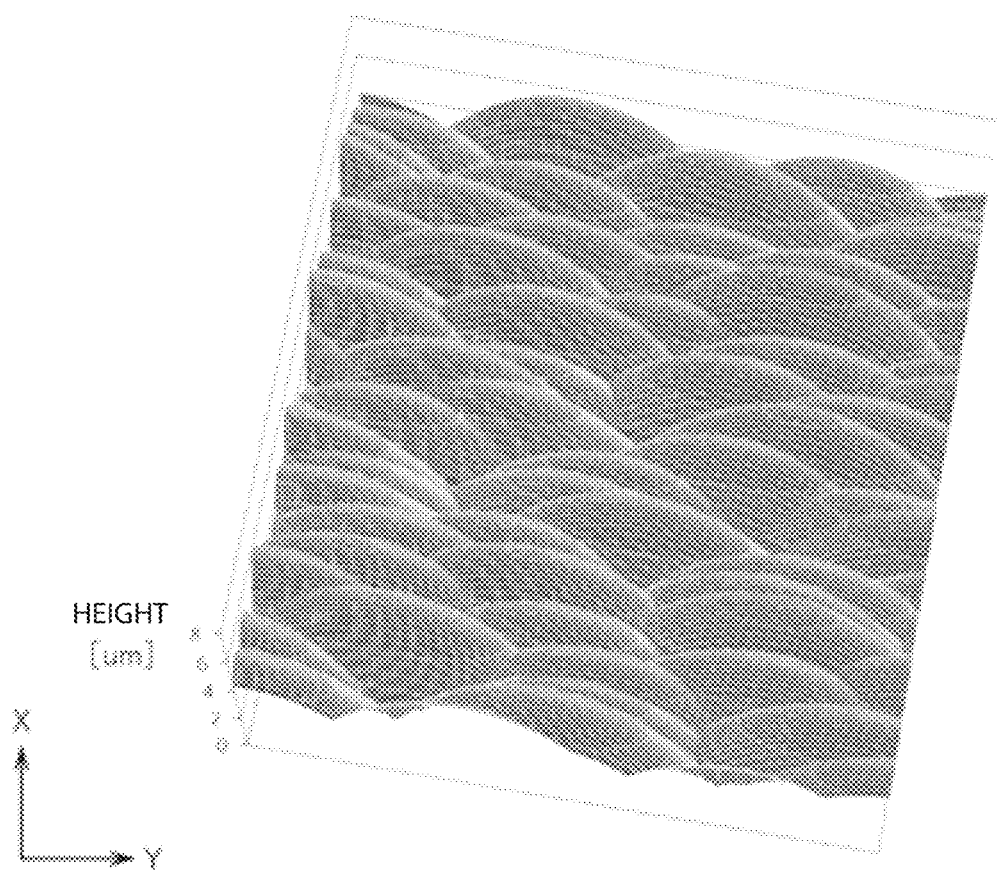
FIG. 5D is an image view illustrating an exemplary group structure obtained by finely and randomly arranging convexities according to the second shape example through a simulation.
Figure 5E:
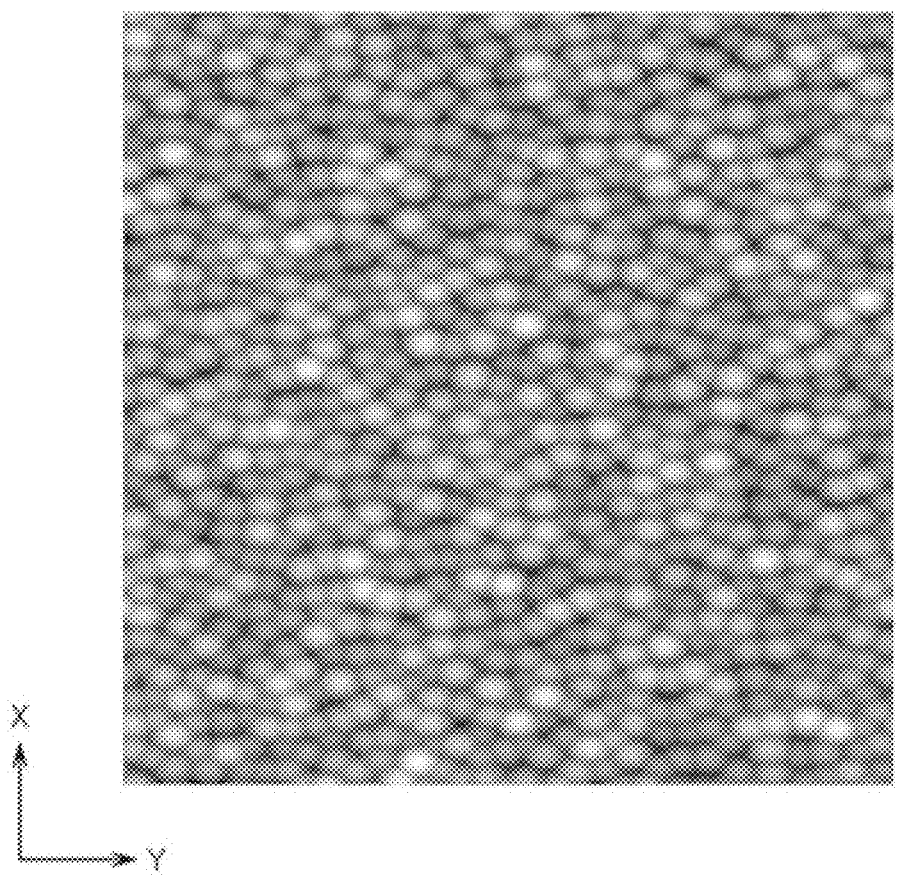
FIG. 5E is an image view illustrating an example in which the group structure obtained by finely and randomly arranging the convexities according to the second shape example is observed with a laser microscope at 20× magnification.

FIG. 5A is an explanatory diagram illustrating a planar shape of the convexities 21 according to the second shape example, and FIG. 5B is a perspective view illustrating a three-dimensional shape of the convexity 21 according to the second shape example. FIG. 5C is an explanatory diagram illustrating a method of determining the three-dimensional shape of the convexity 21 according to the second shape example. In addition, FIG. 5D is an image view illustrating an example of the group structure 20 obtained by finely and randomly arranging the convexities 21 according to the second shape example through a simulation, and FIG. 5E is an image view illustrating an example in which the group structure 20 obtained by finely and randomly arranging the convexities 21 according to the second shape example is observed with a laser microscope at 20× magnification.

As illustrated in FIG. 5A to FIG. 5C, the convexity 21 according to the second shape example may have a three-dimensional shape obtained by cutting part of a donut shape obtained by rotating a circle around a rotation axis located outside the circle by a plane parallel to the rotation axis so as to have a generally elliptical planar shape. In other words, the convexity 21 according to the second shape example may have what is called a torus lens shape. The convexity 21 according to the second shape example having a torus shape is formed by a curved surface including the curved surface of the torus shape.

Specifically, the planar shape of the convexity 21 according to the second shape example is a generally elliptical shape having anisotropy whose diameter in an extending direction becomes Dy and diameter in a direction orthogonal to the extending direction becomes Dx. In addition, the three-dimensional shape of the convexity 21 according to the second shape example is a curved convex shape whose radius of curvature in the extending direction is R and radius of curvature in the direction orthogonal to the extending direction is r. Therefore, the convexity 21 according to the second shape example has a three-dimensional shape having anisotropy in the Y-axis direction.

More specifically, the three-dimensional shape of the convexity 21 according to the second shape example can be determined by cutting the curved shape of the convexity 21 out of the solid torus shape illustrated in FIG. 5C determined by Expression 2 below such that the length in the X-axis direction is Dx and the length in the Y-axis direction is Dy. Specifically, the three-dimensional shape of the convexity 21 according to the second shape example can be determined by cutting an outer circumferential portion of a solid torus shape generated by continuously moving a circle having a small circle radius r on the circumference of a circle having a large circle radius R. Note that in Expression 2, R denotes the large circle radius, and r denotes the small circle radius.

[Ex. 2]

$$Z = \sqrt{\left(R \pm \sqrt{r^2 + y^2}\right)^2 - x^2} \quad (2)$$

Herein, in the convexity 21 according to the second shape example, the diameter Dy in the extending direction, the diameter Dx in the direction orthogonal to the extending direction, the radius of curvature R in the extending direction (that is, the large circle radius R), and the radius of curvature r in the direction orthogonal to the extending direction (that is, the small circle radius r) vary between the respective convexities 21 under a perturbation at the perturbation rate δ. The perturbation rate δ may be more than or equal to 3% and less than or equal to 85%, for example. Since the shape of each of the convexities 21 is more likely to be asymmetric in the case where the perturbation rate δ is more than or equal to 3%, the diffraction component of diffused light through the light diffuser plate 1 can be reduced. On the other hand, in the case where the perturbation rate δ is less than or equal to 85%, the shape of each of the convexities 21 does not vary excessively, so that diffused light through the light diffuser plate 1 can be less likely to become uneven.

FIG. 5D illustrates an image example of the group structure 20 obtained by arranging the convexities 21 according to the second shape example finely and randomly through a simulation. As illustrated in FIG. 5D, it is understood that in the group structure 20 obtained by arranging the convexities 21 according to the second shape example through a simulation, the convexities 21 having anisotropy in the Y-axis direction are arranged finely and randomly. It is also understood that in the group structure 20 illustrated in FIG. 5D, the respective convexities 21 do not have an identical shape to each other, but have asymmetric shapes.

In addition, FIG. 5E illustrates a laser microscopic image example of the group structure 20 obtained by actually arranging the convexities 21 according to the second shape example finely and randomly. As illustrated in FIG. 5E, it is understood that in the group structure 20 obtained by actually arranging the convexities 21 according to the second shape example, the convexities 21 having anisotropy in the Y-axis direction are arranged finely and randomly similarly to the simulation result illustrated in FIG. 5D.

(Other Shape Examples)

Figure 6:
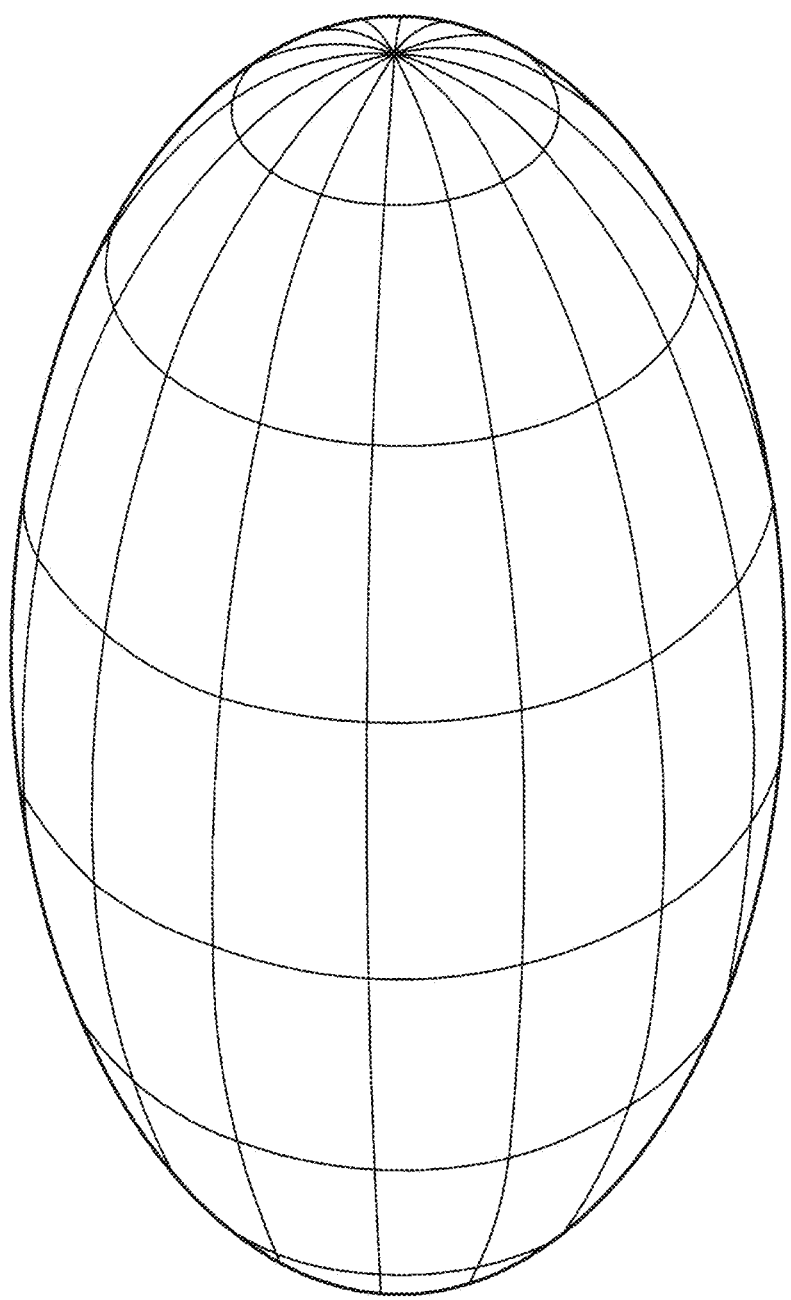
FIG. 6 is an explanatory diagram for describing another shape of convexities.

Note that the shape of the convexity 21 according to the present embodiment is not limited to the above-described first shape example and second shape example as long as it is a three-dimensional shape extended in a direction and having anisotropy. For example, the shape of the convexity 21 according to the present embodiment may be a shape obtained by cutting an oval sphere as illustrated in FIG. 6 by a predetermined plane. FIG. 6 is an explanatory diagram for describing another shape of the convexity 21.

Specifically, as illustrated in FIG. 6, the three-dimensional shape of the convexity 21 according to the present embodiment may be a three-dimensional shape obtained by cutting an oval sphere obtained by extending a sphere in one axial direction by a plane parallel to the one axial direction. Even in such a case, the convexity 21 according to the present embodiment has a three-dimensional shape extended in a direction and having anisotropy, so that the anisotropic shape of light diffused through the light diffuser plate 1 at the projection surface can be controlled.

(2.2. Arrangement of Convexities)

Next, an exemplary arrangement of the plurality of convexities 21 will be described with reference to FIG. 7 to FIG. 12.

Figure 7:
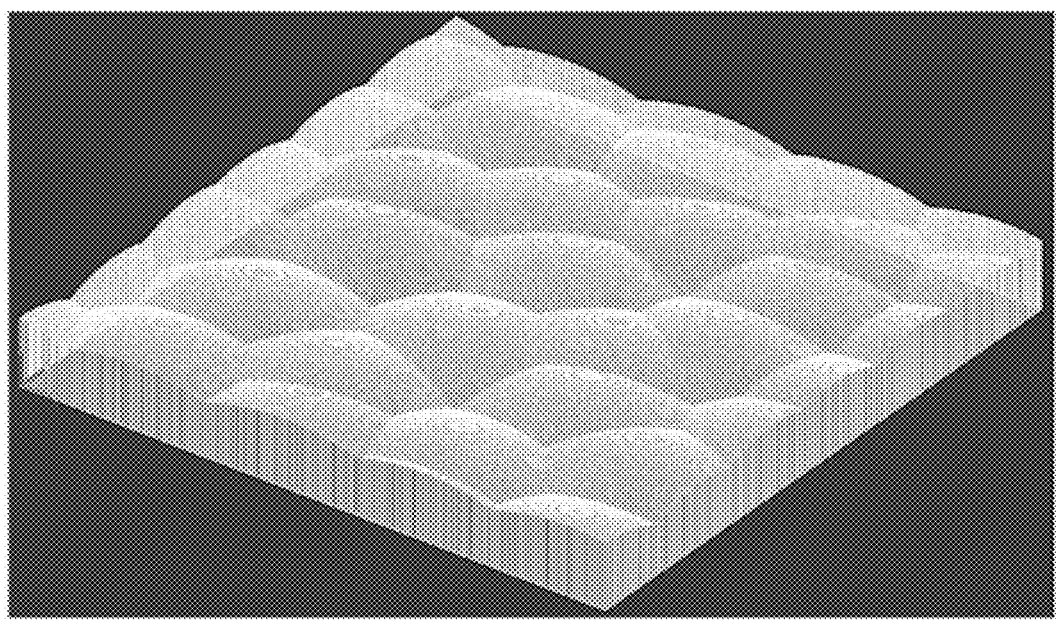
FIG. 7 is a perspective view illustrating an exemplary group structure obtained by finely and randomly arranging a plurality of convexities.
Figure 8:
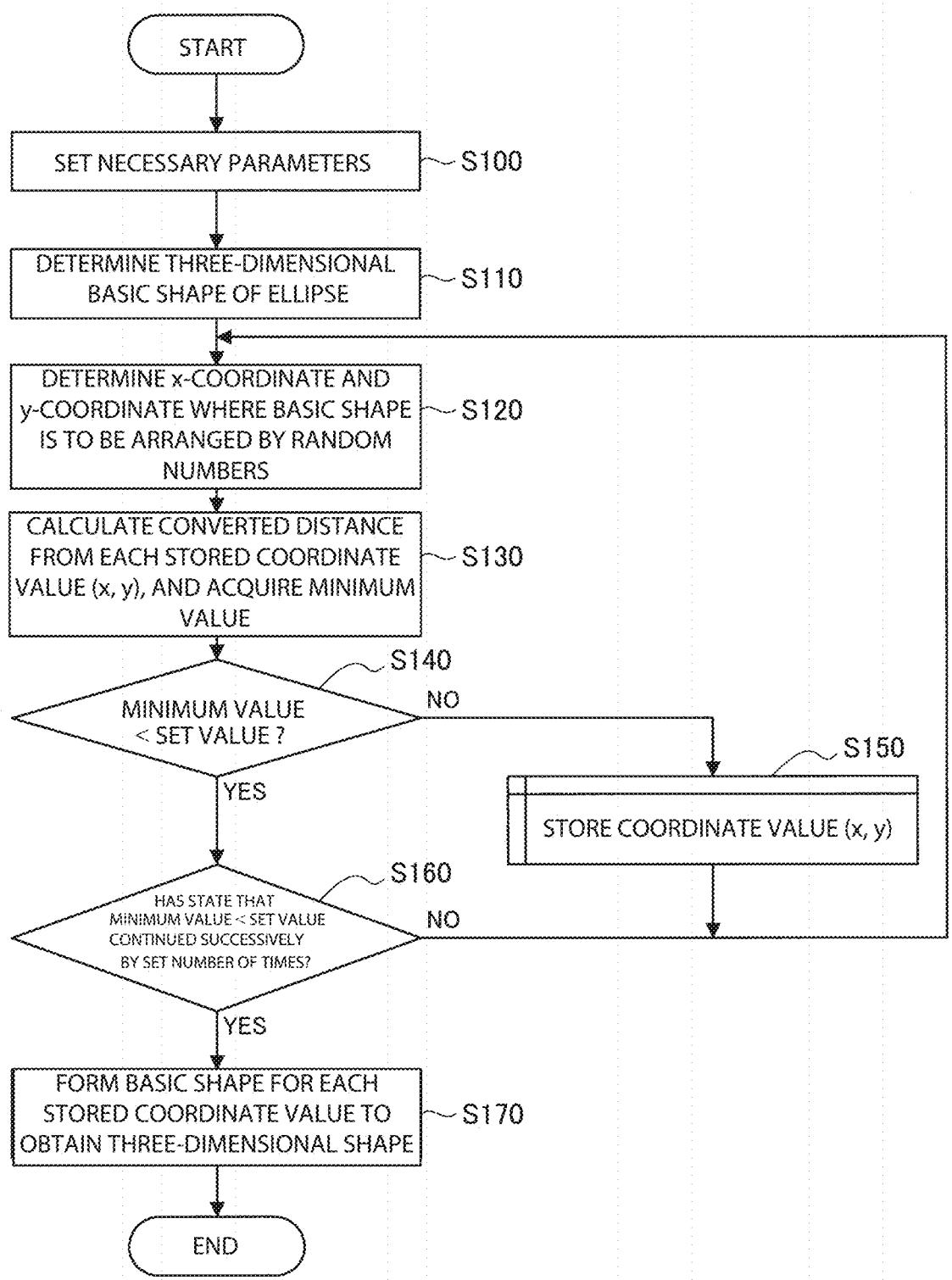
FIG. 8 is a flowchart describing an exemplary method of finely and randomly arranging a plurality of convexities.
Figure 9:
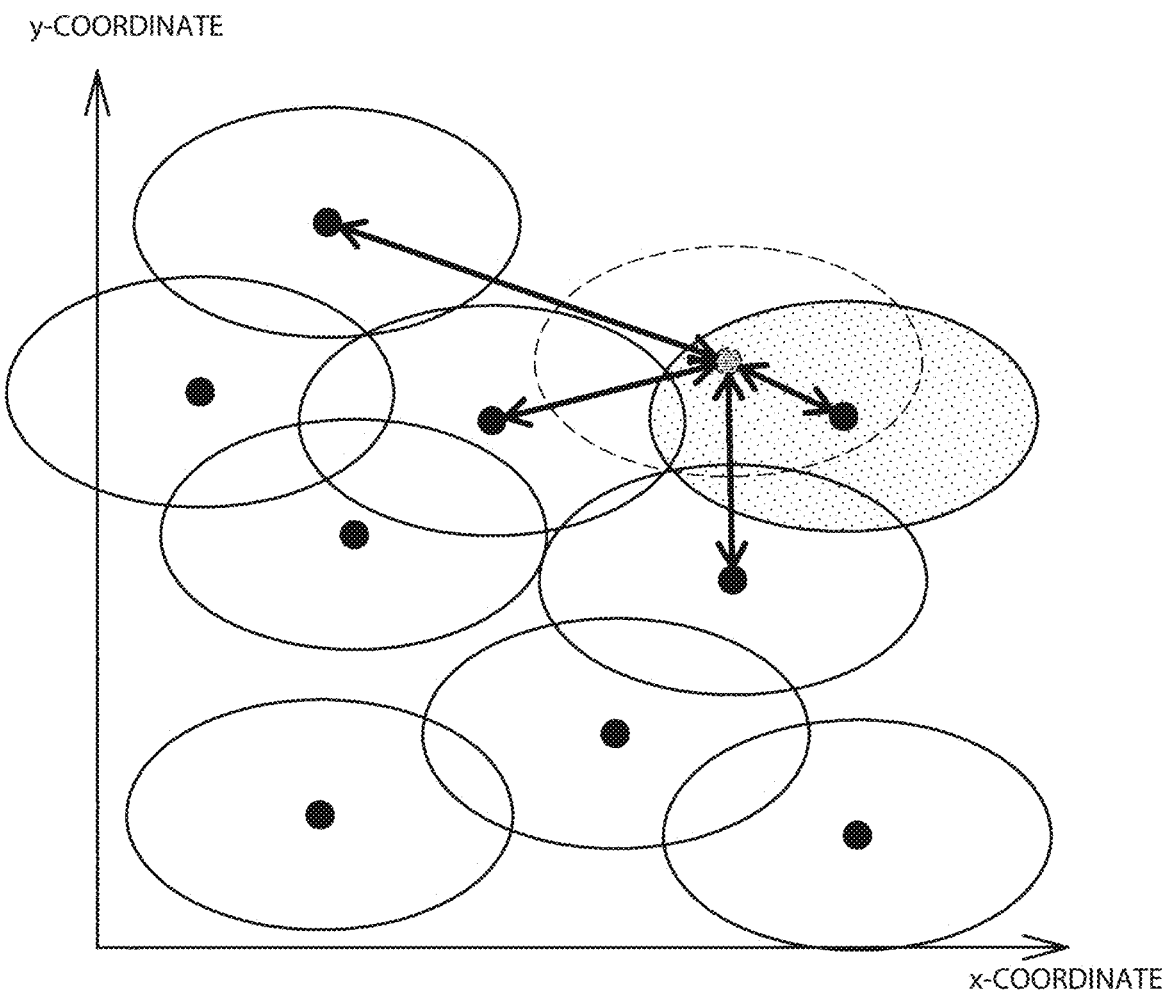
FIG. 9 is an explanatory diagram for describing a converted distance between generated coordinates and the center of each of convexities.

First, an exemplary arrangement of the plurality of convexities 21 for configuring the group structure 20 will be described with reference to FIG. 7 to FIG. 9. FIG. 7 is a perspective view illustrating an example of the group structure 20 obtained by arranging the plurality of convexities 21 finely and randomly. FIG. 8 is a flowchart describing an exemplary method of arranging the plurality of convexities 21 in a close-packed manner and randomly, and FIG. 9 is an explanatory diagram for describing a converted distance between generated coordinates and the center of each of the convexities 21.

The convexity 21 according to the present embodiment has a basic shape whose planar shape is an elliptical shape, and which is convex in a direction perpendicular to one main surface of the base material 10. By arranging the plurality of convexities 21 having such a basic shape on the base material 10 finely and randomly in an overlapping manner, the group structure 20 having a shape as illustrated in FIG. 7 can be formed. Specifically, by arranging the convexities 21 having the basic shape (the shape before perturbing the radius of curvature and opening size) in accordance with the flowchart illustrated in FIG. 8, the convexities 21 can be arranged finely and randomly.

As illustrated in FIG. 8, parameters necessary for determining the basic shape of the convexities 21 are set first (S100). Subsequently, on the basis of the set parameters, the basic shape of the convexities 21 is determined (S110). Specifically, a three-dimensional shape whose planar shape is elliptical, and which is convex with a curved surface is determined as the basic shape of the convexities 21. Next, an X-coordinate and a Y-coordinate where the basic shape of the convexities 21 is to be arranged are determined by random numbers (S120).

Subsequently, a converted distance between the X-coordinate and Y-coordinate determined by the random numbers and the X-coordinate and Y-coordinate of the basic shape of the convexities 21 already stored in S150 is calculated, and a minimum value of the calculated converted distance is acquired (S130). Specifically, as illustrated in FIG. 9, the converted distance between the X-coordinate and Y-coordinate determined in S120 and the center of each of the convexities 21 already stored in S150 which will be described later is calculated, and a minimum value of the calculated converted distance is acquired.

Herein, the converted distance refers to a distance when compressing the elliptical shape which is the planar shape of the convexity 21 in the longer axis direction for conversion into a true circle. For example, when expressing the length of the elliptical shape which is the planar shape of the convexity 21 in the longer axis direction by A, the length in the shorter axis direction by B, and the central coordinates of two of the convexities 21 for which the distance is to be calculated by $(x_1, y_1)$ and $(x_2, y_2)$, then, a converted distance L can be calculated by Expression 3 below.

[Ex. 3]

$$L = \sqrt{\left\{\frac{B}{A}(x_1 - x_2)\right\}^2 + (y_1 - y_2)^2} \quad (3)$$

Next, it is determined whether the acquired minimum value of the converted distance is less than a set value (S140). Herein, in a case where the acquired minimum value of the converted distance is more than or equal to the set value (No in S140), the X-coordinate and Y-coordinate determined in S120 are stored (S150), and a return is made to S120, and the X-coordinate and Y-coordinate where the basic shape of the convexity 21 is to be arranged are determined again by random numbers. The stored X-coordinate and Y-coordinate are used thereafter for calculating the converted distance from the X-coordinate and Y-coordinate determined by the random numbers in S130. In other words, only the central coordinates of a convexity 21 whose distance from a convexity 21 already arranged is more than or equal to the set value are stored in S150. Note that the set value may be a value such as 10% when assuming the diameter of the elliptical shape of the convexity 21 in the shorter axis direction as 100%, for example.

In a case where the acquired minimum value of the converted distance is less than the set value (Yes in S140), it is determined whether or not the state in which the acquired minimum value of the converted distance is less than the set value has continued successively by a set number of times. In a case where the state in which the acquired minimum value of the converted distance is less than the set value has not continued by the set number of times (NO in S160), a return is made to S120, and the X-coordinate and Y-coordinate where the basic shape of the convexity 21 is to be arranged are determined again by random numbers (S120).

On the other hand, in a case where the state in which the acquired minimum value of the converted distance is less than the set value has continued by the set number of times (Yes in S160), it is determined that the convexities 21 have been arranged densely. In other words, in the case where the state in which the acquired minimum value of the converted distance is less than the set value has continued by the set number of times, it is determined that a convexity 21 can no longer be located away from another convexity 21 by more than or equal to the set value, and the convexities 21 have been arranged sufficiently densely. Thereafter, by forming the basic shape of the convexity 21 for each of the stored coordinates, the three-dimensional shape of the group structure 20 in which the convexities 21 have been arranged randomly and densely can be formed. In addition, each of the convexities 21 may be formed such that the shape symmetry is lowered by perturbing the radius of curvature and opening size respectively from those of the basic shape.

The method of arranging the convexities 21 described with reference to FIG. 8 and FIG. 9 is a method of arranging the convexities 21 so as to avoid a region in which the convexities 21 are already arranged. According to this arrangement method, the group structure 20 in which the convexities 21 have been arranged randomly and more finely can be formed. However, the method of arranging the convexities 21 according to the present embodiment is not limited to the above-described method, but another method may be used.

According to the above-described method of arranging the convexities 21, the convexities 21 can be arranged while exerting control so as to make an overlapping allowance between the respective convexities 21 larger than 0%, and so as not to make the overlapping allowance between the respective convexities 21 excessively large.

Figure 10:
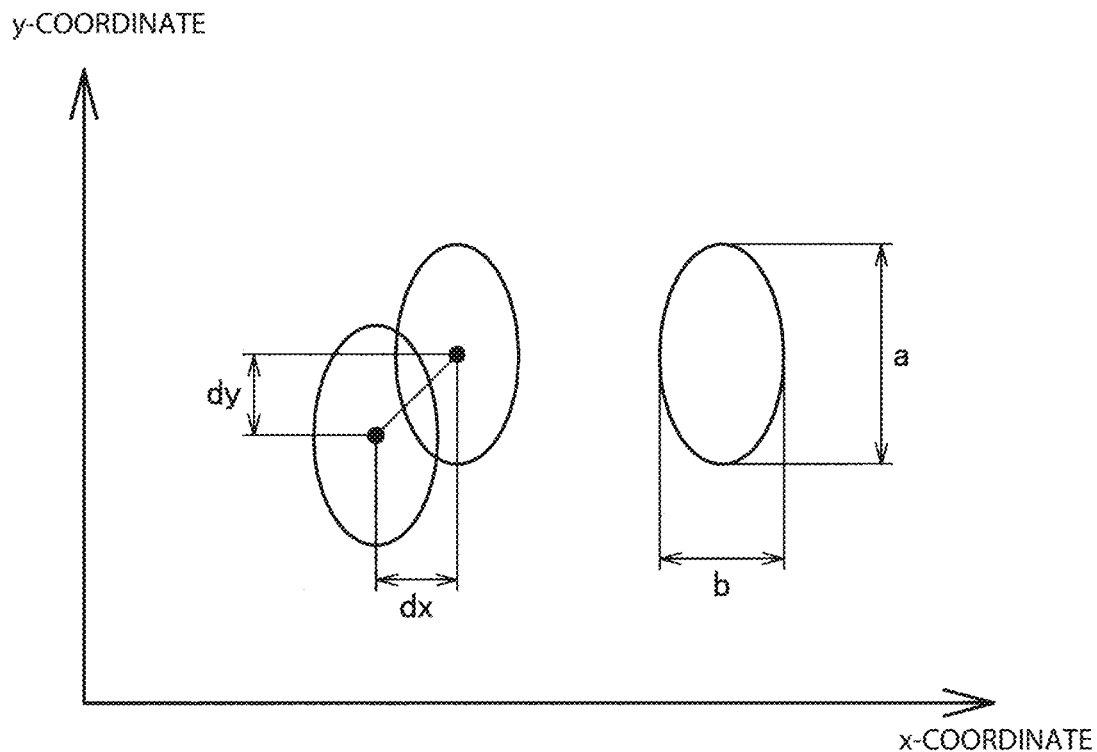
FIG. 10 is an explanatory diagram for describing an overlapping allowance between convexities.
Figure 11:
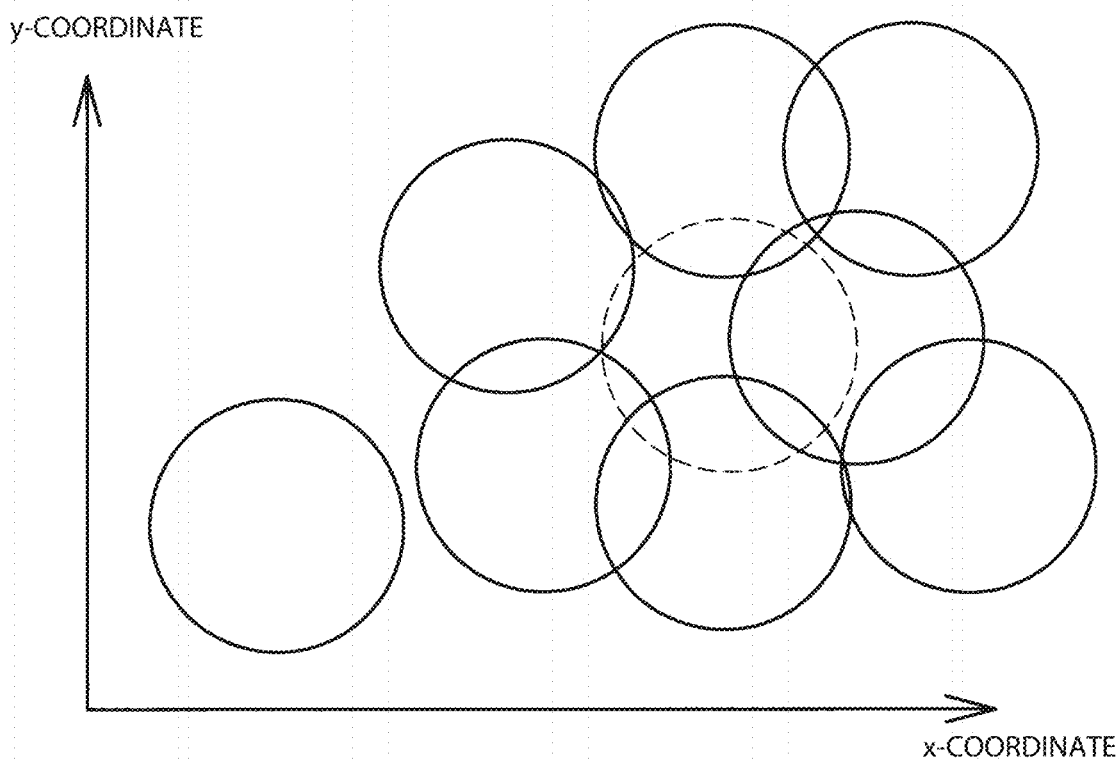
FIG. 11 is an explanatory diagram describing arranging convexities so as to eliminate a flat part while appropriately controlling the overlapping allowance between convexities.
Figure 12:
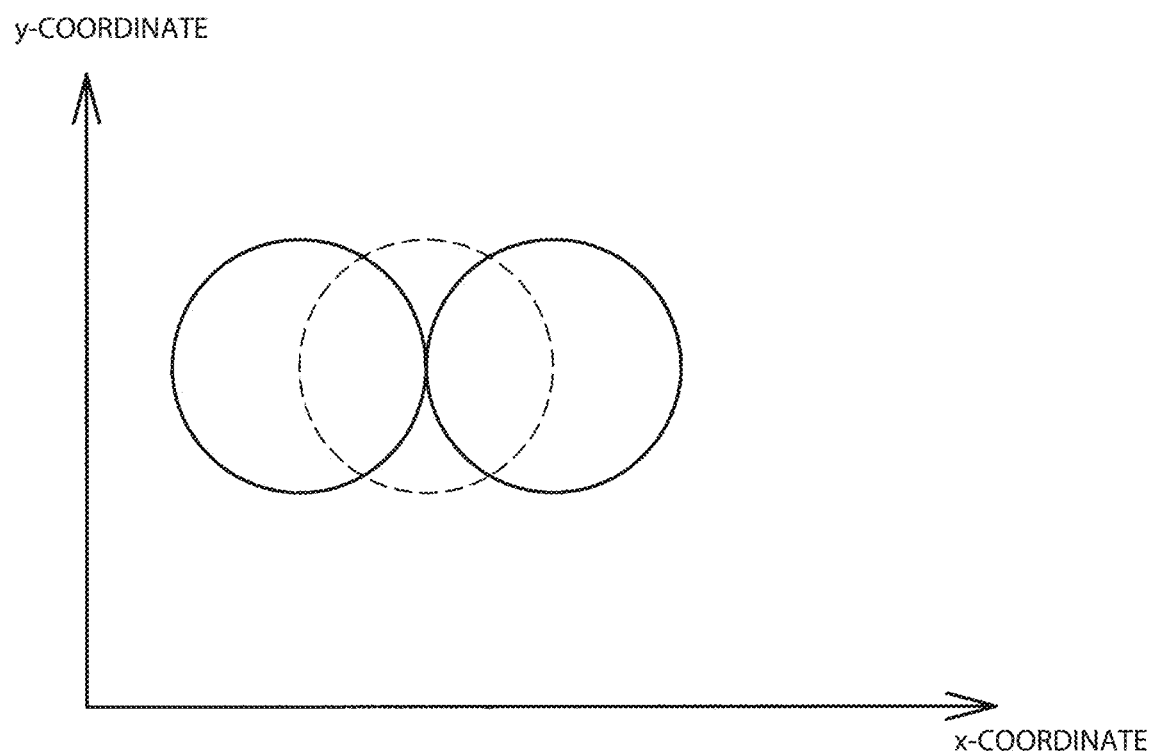
FIG. 12 is an explanatory diagram describing arranging convexities so as to eliminate a flat part while appropriately controlling the overlapping allowance between convexities.

This point will be described with reference to FIG. 10 to FIG. 12. FIG. 10 is an explanatory diagram for describing the overlapping allowance between the convexities 21. FIG. 11 and FIG. 12 are explanatory diagrams describing arranging the convexities 21 so as to eliminate flat parts while appropriately controlling the overlapping allowance between the convexities 21.

First, the overlapping allowance between the convexities 21 will be described with reference to FIG. 10. The overlapping allowance refers to an index representing an overlapping rate between the convexities 21. The overlapping allowance can be calculated from a center-to-center distance when compressing the elliptical shapes of the convexities 21 in the longer axis direction to convert the convexities 21 into true circle shapes.

Specifically, as illustrated in FIG. 10, first, the diameter of the elliptical shape of each of the convexities 21 in the longer axis direction is denoted by a, the diameter in the shorter axis direction is denoted by b, and differences between the central coordinates of the elliptical shapes of the respective convexities 21 are denoted by dx, dy. At this time, a center-to-center distance d of the elliptical shapes when compressing the elliptical shapes of the convexities 21 in the longer axis direction can be calculated by Expression 4 below. Furthermore, an overlapping allowance Ov between the convexities 21 can be calculated by Expression 5 below using the center-to-center distance d.

[Ex. 4]

$$d = \sqrt{dx^2 + \left(\frac{b}{a}dy\right)^2} \quad (4)$$

[Ex. 5]

$$Ov = \frac{b - d}{b} \quad (5)$$

The overlapping allowance Ov between the convexities 21 is an index which becomes 1 (100% in percentage) in a case where the convexities 21 fully overlap each other, becomes 0 (0% in percentage) in a case where the convexities 21 are in contact, and becomes <0 (that is, a negative value) in a case where the convexities 21 are apart from each other. According to the above-described method of arranging the convexities 21, the overlapping allowance between the respective convexities 21 can be controlled to be more than 0% and less than 100%, and preferably more than 25% and less than 75%.

For example, in a case where the convexities 21 are arranged such that a plurality of real circles overlap each other as illustrated in FIG. 11, according to the above-described method of arranging the convexities 21, the convexity 21 can be arranged as indicated by a broken line circle so as to eliminate a flat part between the convexities 21.

Alternatively, in a case where the convexities 21 are arranged such that two solid line circles come into contact with each other as illustrated in FIG. 12, according to the above-described method of arranging the convexities 21, the convexity 21 can be arranged as indicated by a broken line circle so as to eliminate a flat part between the convexities 21. In such a case, the overlapping allowance between the convexities 21 is 0.5 (50% in percentage).

As described above, the light diffuser plate 1 according to the present embodiment is provided with the group structure 20 (a microlens array) which is a group of micro concavities/convexities deployed on the main surface of the base material 10. A minimum unit of the group structure 20 is the micro convexity 21 (or concavity), and each of the convexities 21 functions as a single lens (microlens). The phase distribution of the optical aperture of each of the convexities 21 varies depending on the orientation. Each of the convexities 21 has a surface shape only including a curved surface, and has a generally elliptical planar shape. The convexities 21 are different in vertical cross sectional shape depending on the direction of the cutting plane. As illustrated in FIG. 3, the contour line of each of the convexities 21 (the boundary line between one convexity 21 and a plurality of other convexities 21 adjacent to the one convexity 21) includes at least two curved lines having radii of curvature different from each other. By arranging the plurality of convexities 21 having such a structure on the main surface of the base material 10 finely, continuously, and randomly without any gap between each other, the group structure 20 as an optical structure is configured. The group structure 20 having such a configuration is less susceptible to variations in macro light amount that depends upon the surface structure or changes in light amount caused by diffracted light, and has highly homogeneous, various light distribution control properties. The group structure 20 is deployed on one side surface, both side surfaces, or a curved surface of a medium, and provides an optical function.

<3. Method of Manufacturing Light Diffuser Plate>

Subsequently, an exemplary method of manufacturing the light diffuser plate 1 according to the present embodiment will be briefly described with reference to FIG. 13. FIG. 13 is a flowchart illustrating an exemplary flow of the method of manufacturing a light diffuser plate according to the present embodiment.

As illustrated in FIG. 13, a base material is cleaned first (S200). The base material may have a roll shape such as a glass roll, for example, or may have a flat plate shape such as a glass wafer or silicon wafer.

Next, a resist layer is formed on one main surface of the base material after cleaning (S210). For example, the resist layer can be formed from a resist through use of a metal oxide. Specifically, on a base material having a roll shape, the resist layer can be formed by performing resist spray coating or dipping treatment. On the other hand, on a base material having a flat plate shape, the resist layer can be formed by performing various types of resist coating treatment.

Subsequently, processing of exposing a pattern corresponding to the shape of the group structure 20 is executed on the base material on which the resist layer has been formed (S220). The exposure processing can be executed by appropriately applying a publicly known exposure method such as, for example, exposure through use of a gray scale mask, multiple exposure by overlapping a plurality of gray scale masks, gray mask exposure, or laser drawing.

Thereafter, the base material after exposure is developed (S230). A pattern is thereby formed on the resist layer. Development can be executed using an appropriate developing solution in accordance with the material of the resist layer. For example, in a case where the resist layer is formed from a resist through use of a metal oxide, the resist layer can be developed using an inorganic or organic alkaline solution.

Next, using the resist layer on which the pattern has been formed, a master having a surface on which the shape of the group structure 20 has been formed is manufactured (S240). Specifically, a glass master can be manufactured by performing glass etching using the resist layer on which the pattern has been formed as a mask. Alternatively, a metal master can be manufactured by subjecting the resist layer on which the pattern has been formed to Ni sputtering or nickel plating (NED treatment) to form a nickel layer on which the pattern has been transferred, and then separating the base material.

Subsequently, by transferring the pattern to a resin film or the like using the master, a soft mold having a surface on which an inverted shape of the group structure 20 has been formed can be manufactured (S250).

Furthermore, by executing imprinting processing is executed on the glass substrate or film base material using the soft mold, the light diffuser plate 1 according to the present embodiment can be manufactured (S260).

Note that the manufacturing method illustrated in FIG. 13 is merely an example, and the method of manufacturing the light diffuser plate 1 according to the present embodiment is not limited to the above example.

<4. Application Example of Light Diffuser Plate>

Next, an exemplary application example of the light diffuser plate 1 according to the present embodiment will be briefly described with reference to FIG. 14A to FIG. 14H. FIG. 14A to FIG. 14H are explanatory diagrams each schematically illustrating an exemplary application example of the light diffuser plate 1 according to the present embodiment.

The light diffuser plate 1 according to the present embodiment as described above is mounted as appropriate on a device that needs to diffuse light to provide its function. Examples of such a device can include display devices including various displays, projecting devices such as a projector, and lighting devices.

Figure 14A:
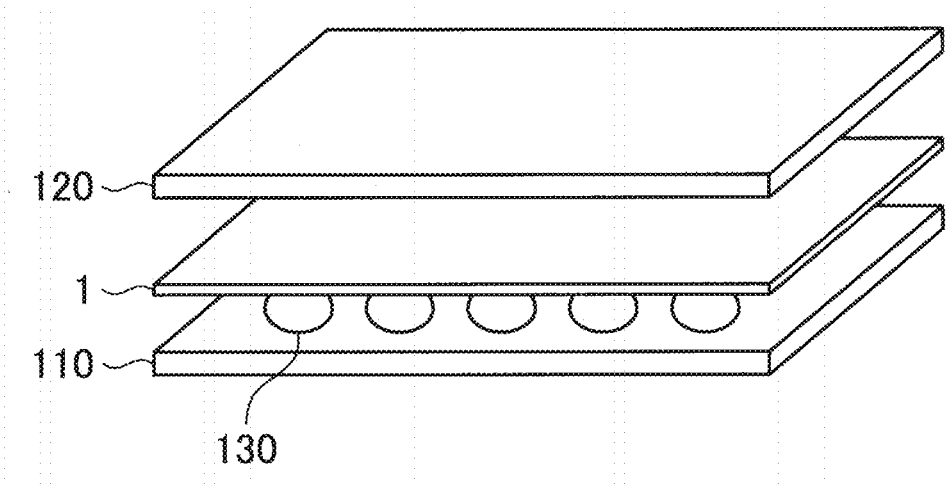
FIG. 14A is an explanatory diagram schematically illustrating an exemplary application example of the light diffuser plate according to the embodiment.
Figure 14B:
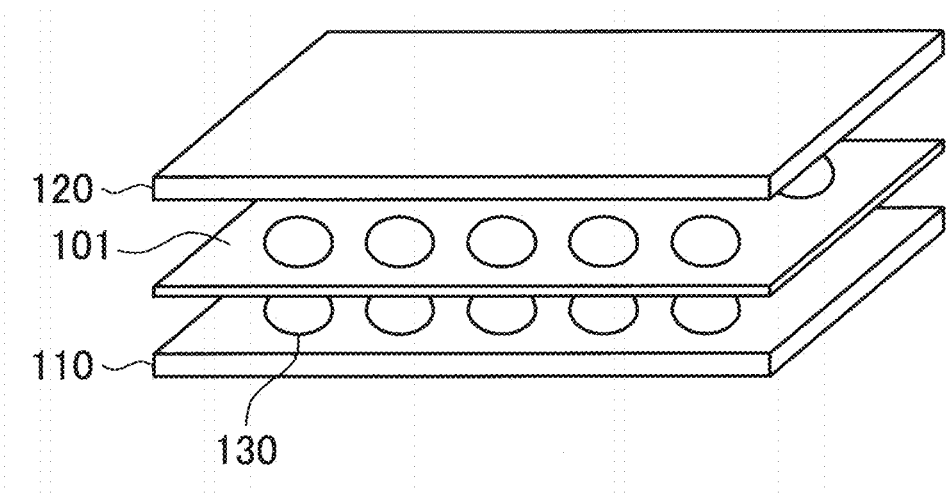
FIG. 14B is an explanatory diagram schematically illustrating the exemplary application example of the light diffuser plate according to the embodiment.
Figure 14C:
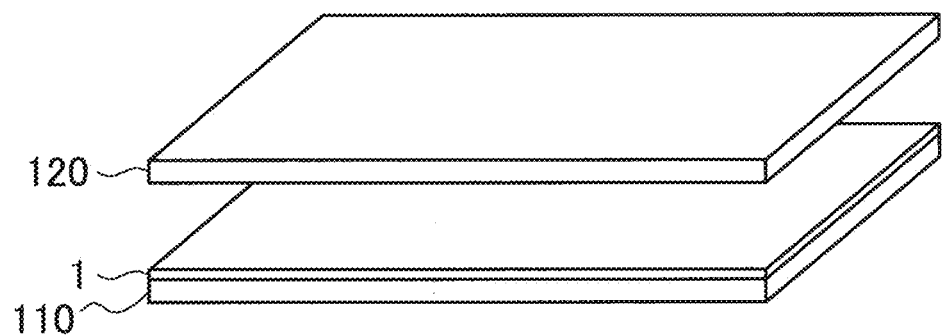
FIG. 14C is an explanatory diagram schematically illustrating the exemplary application example of the light diffuser plate according to the embodiment.

As illustrated in FIG. 14A to FIG. 14C, the light diffuser plate 1 according to the present embodiment can be used for diffusing light of a backlight in a liquid crystal display device, for example.

Specifically, as illustrated in FIG. 14A, the light diffuser plate 1 may be provided between a liquid crystal panel 120 and a light emitting diode (LED) backlight 130 provided on a reflector 110 in a transmissive liquid crystal display device. Alternatively, as illustrated in FIG. 14B, the light diffuser plate 1 may be a light diffuser plate-integrated lens 101 integrated with lenses, provided between the liquid crystal panel 120 and the LED backlight 130 provided on the reflector 110 in a transmissive liquid crystal display device. Still alternatively, as illustrated in FIG. 14C, the light diffuser plate 1 may be provided between the liquid crystal panel 120 and the reflector 110 in a reflective liquid crystal display device.

Figure 14D:
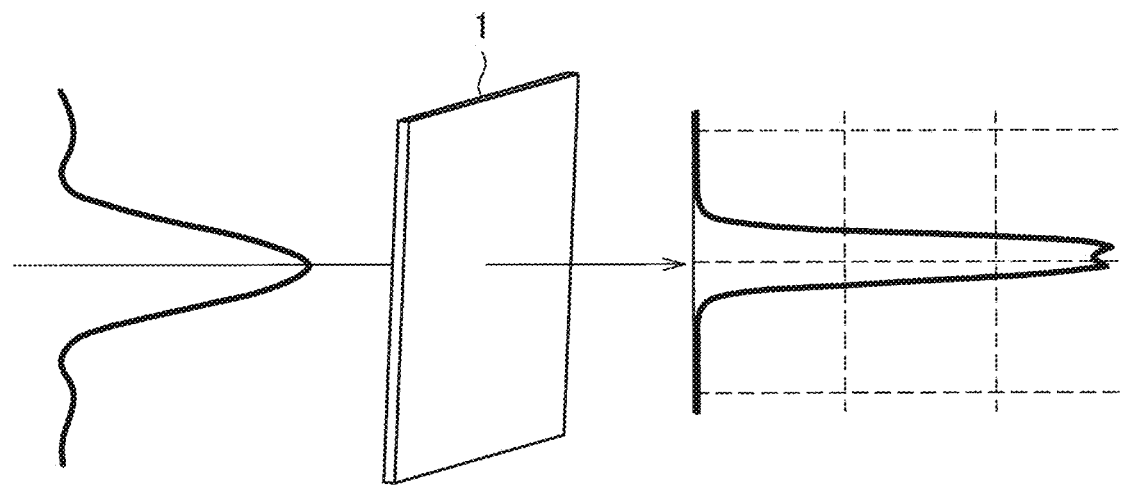
FIG. 14D is an explanatory diagram schematically illustrating the exemplary application example of the light diffuser plate according to the embodiment.

As illustrated in FIG. 14D, the light diffuser plate 1 according to the present embodiment can be used for a light shaping application for shaping the waveform of emitted light, for example.

Figure 14E:
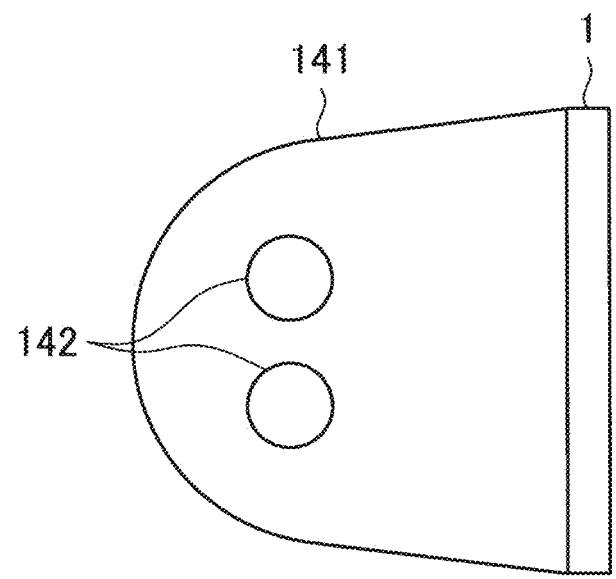
FIG. 14E is an explanatory diagram schematically illustrating the exemplary application example of the light diffuser plate according to the embodiment.
Figure 14F:
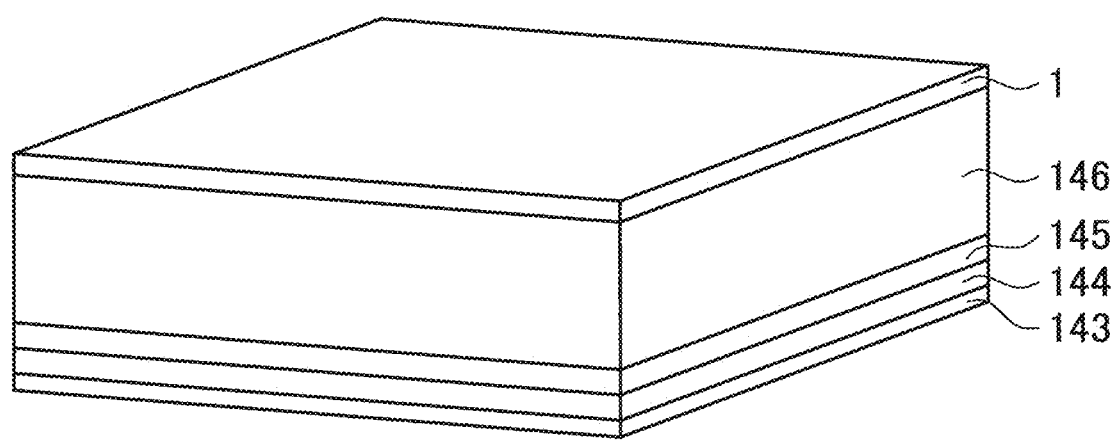
FIG. 14F is an explanatory diagram schematically illustrating the exemplary application example of the light diffuser plate according to the embodiment.

As illustrated in FIG. 14E and FIG. 14F, the light diffuser plate 1 according to the present embodiment can be used for diffusing light from a light source in a lighting device, for example.

Specifically, as illustrated in FIG. 14E, in a lighting device in which a light source 142 is provided in a reflection surface 141 having a concave shape, the light diffuser plate 1 may be provided on a light exiting surface. Alternatively, as illustrated in FIG. 14F, in an organic EL lighting device in which a negative electrode 143, an organic light emitting layer 144, a positive electrode 145, and a glass substrate 146 are laminated sequentially, the light diffuser plate 1 may be provided on a light diffusing surface which is the upper surface of the glass substrate 146.

Figure 14G:
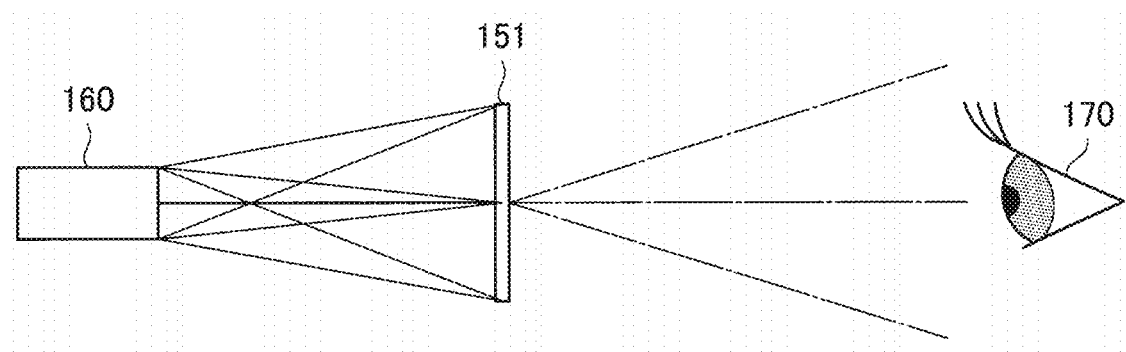
FIG. 14G is an explanatory diagram schematically illustrating the exemplary application example of the light diffuser plate according to the embodiment.
Figure 14H:
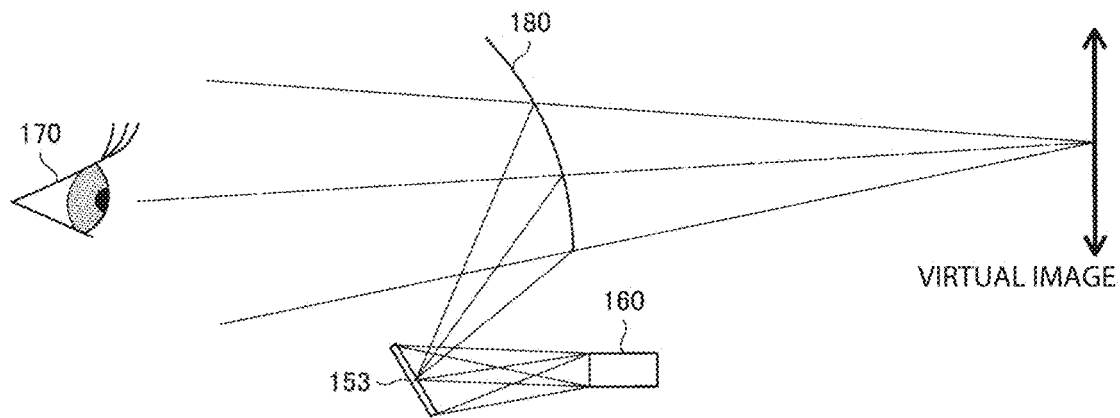
FIG. 14H is an explanatory diagram schematically illustrating the exemplary application example of the light diffuser plate according to the embodiment.

As illustrated in FIG. 14G and FIG. 14H, the light diffuser plate 1 according to the present embodiment can be used for diffusing light in a projecting device such as a projector, for example.

Specifically, as illustrated in FIG. 14G, in a transmissive projecting device with which an image transmitted through a projection surface 151 is presented to a user 170, the light diffuser plate 1 can be applied to the projection surface 151 (for example, a transmissive screen or Fresnel lens) on which light from a projector 160 is projected. Alternatively, as illustrated in FIG. 14H, in a reflective projecting device with which an image reflected by a reflective screen 153 and projected on a window shield is presented to the user 170, the light diffuser plate 1 can be applied to the reflective screen 153 that reflects light from the projector 160.

Note that the devices to which the light diffuser plate 1 according to the present embodiment is applied are not limited to the above examples. The light diffuser plate 1 according to the present embodiment can be applied to any publicly known device as long as it is a device that utilizes diffusion of light.

Examples

Next, the light diffuser plate according to the present embodiment will be described specifically while presenting examples and comparative examples. Note that the examples presented below are merely examples of the light diffuser plate according to the present invention, and the light diffuser plate according to the present embodiment is not limited to the following examples.

Light diffuser plates according to the examples and comparative examples were manufactured using a method which will be described below while changing the shape of the group structure.

Specifically, a glass or silicon base material was cleaned first, and then, a photoresist was applied to one main surface of the base material to a resist thickness of 2 μm to 15 μm. Note that a coupling agent may be used for increasing adhesion between the base material and the resist. As the photoresist, a positive photoresist such as PMER-LA900 (made by TOKYO OHKA KOGYO CO., LTD.) or AZ (registered trademark) 4620 (made by AZ Electronic Materials) can be used, for example. Alternatively, a negative photoresist can be used as the photoresist.

Next, exposure was performed by drawing a pattern on the resist on the base material with a laser drawing device through use of laser having a wavelength of 405 nm. Alternatively, exposure may be performed by subjecting the resist on the base material to mask exposure with a stepper exposure device through use of g-line.

Subsequently, the resist was developed to form a pattern on the resist. As a developing solution, a tetramethylammonium hydroxide (TMAH) solution such as NMD-W (made by TOKYO OHKA KOGYO CO., LTD.) or PMER P7G (made by TOKYO OHKA KOGYO CO., LTD.) can be used, for example.

Next, a master was manufactured using the resist on which the pattern had been formed. Specifically, the master can be manufactured by forming the resist pattern on the base material by glass etching through use of Ar gas or $CF_4$ gas. Alternatively, the master can be manufactured by forming a nickel layer on which the resist pattern has been transferred by Ni sputtering to a film thickness of approximately 50 nm, nickel plating (for example, a nickel sulfamate bath) to a film thickness of 100 μm to 200 μm, or the like.

Subsequently, a light diffuser plate was manufactured by transferring the pattern of the master to resin or the like by imprinting. Specifically, the light diffuser plate was manufactured by applying an acrylic light-curing resin to a polyethylene terephthalate (PET) or polycarbonate (PC) base material, transferring the pattern of the master to the applied acrylic light-curing resin, and subjecting the resin to UV curing.

The shapes of the group structures of the manufactured light diffuser plates according to the examples and comparative examples are shown in Table 1 below. Note that the group structures of the light diffuser plates according to the examples shall have anisotropy in the Y-axis direction.

TABLE 1

|  | Type of curved surface | Basic diameter D (μm) | | Radius of curvature R (μm) | | Small circle radius (μm) | Large circle radius (μm) | Perturbation rate |
| --- | --- | --- | --- | --- | --- | --- | --- | --- |
|  |  | X | Y | X | Y | r | R | (%) |
| Example 1 | anamorphic | 20 | 200 | 12 | 500 | — | — | 5 |
| Example 2 | torus | 60 | 60 | 42 | 42 | 42 | 42 | 10 |
| Example 3 | torus | 80 | 80 | 160 | 160 | 160 | 160 | 10 |
| Comparative example 1 | hexagonal close-packed structure | 50 | 30 | — | — | 0 | — | — |
| Comparative example 2 | hexagonal close-packed structure | 50 | 30 | — | — | 5 | — | — |
| Comparative example 3 | hexagonal close-packed structure | 50 | 30 | — | — | 5 | — | — |

TABLE 1-continued

| | Type of curved surface | Basic diameter D (μm) X | Basic diameter D (μm) Y | Radius of curvature R (μm) X | Radius of curvature R (μm) Y | Small circle radius (μm) r | Large circle radius (μm) R | Perturbation rate (%) |
|---|---|---|---|---|---|---|---|---|
| Example 4 | anamorphic | 20 | 35 | 15 | 35 | — | — | 2 |
| Example 5 | anamorphic | 20 | 35 | 15 | 35 | — | — | 3 |
| Example 6 | anamorphic | 20 | 35 | 15 | 35 | — | — | 5 |
| Example 7 | torus | 60 | 60 | 42 | 42 | 42 | 42 | 50 |
| Example 8 | torus | 60 | 60 | 42 | 42 | 42 | 42 | 75 |
| Example 9 | torus | 60 | 60 | 42 | 42 | 42 | 42 | 85 |
| Comparative example 4 | anamorphic | 25 | 25 | 25 | 25 | — | — | 5 |
| Example 10 | anamorphic | 25 | 25 | 25 | 26 | — | — | 5 |
| Example 11 | anamorphic | 25 | 25 | 25 | 27 | — | — | 5 |
| Example 12 | anamorphic | 25 | 25 | 25 | 28 | — | — | 5 |
| Example 13 | anamorphic | 20 | 800 | 12 | 10,000 | — | — | 5 |
| Example 14 | anamorphic | 20 | 1,000 | 12 | 100,000 | — | — | 5 |
| Example 15 | torus | 20 | 2,000 | 12 | 100,000 | 12 | 100,000 | 5 |

In addition, the shapes of the group structures of the manufactured light diffuser plates were observed with a laser microscope. Furthermore, light distribution patterns of the manufactured light diffuser plates were simulated with Virtual-Lab (made by LightTrans GmbH), and light distribution properties of the manufactured light diffuser plates were measured with a light distribution property measuring instrument, Mini-Diff (made by Light Tec).

Results of measuring a maximum height difference $\Delta Z$, an optical phase difference component $\Psi$ at a minimum wavelength of 0.5 μm ($\lambda$ min.) and an optical phase difference component $\Psi$ at a maximum wavelength of 2 μm ($\lambda$ max.) of the group structure of the manufactured light diffuser plates according to the examples and comparative examples, as well as their dispersions $\sigma(Z)$ and $\sigma(\Psi)$ are shown in Table 2 below.

Table 2 also shows an anisotropic light contribution rate (ALCR) which is an index indicating anisotropy of light diffused through the light diffuser plates according to the examples and comparative examples. ALCR is a value obtained by dividing a half width $W_O$ of the light distribution angle in the X-axis direction (the direction orthogonal to the extending direction of convexities or concavities) of each light diffuser plate by a half width $W_L$ of the light distribution angle in the Y-axis direction (the extending direction of convexities or concavities) (ALCR=$W_O/W_L$). It is indicated that, as ALCR is larger, anisotropy of light distribution of the light diffuser plate is higher.

TABLE 2

| | Convexities | $\Delta Z$ (μm) | $\Psi$ $\Delta Z(n-1)/\lambda$ min. | $\Psi$ $\Delta Z(n'-1)/\lambda$ max. | $\sigma(Z)$ (μm) | $\sigma(\Psi)$ $\sigma(Z)(n-1)/\lambda$ min. | $\sigma(\Psi)$ $\sigma(Z)(n'-1)/\lambda$ max. | ALCR |
|---|---|---|---|---|---|---|---|---|
| Example 1 | anamorphic | 6.7 | 19.0 | 1.3 | 0.77 | 2.20 | 0.154 | 4.2 |
| Example 2 | torus | 7.1 | 20.3 | 1.4 | 0.92 | 2.63 | 0.184 | 1.6 |
| Example 3 | torus | 7.2 | 20.7 | 1.4 | 0.94 | 2.69 | 0.188 | 1.8 |
| Comparative example 1 | hexagonal close-packed structure | 3.7 | 10.4 | 0.7 | 0.72 | 2.06 | 0.144 | 1.4 |
| Comparative example 2 | hexagonal close-packed structure | 5.7 | 16.4 | 1.1 | 1.06 | 3.03 | 0.212 | 1.4 |
| Comparative example 3 | hexagonal close-packed structure | 7.3 | 20.9 | 1.5 | 1.65 | 4.71 | 0.330 | 1.4 |
| Example 4 | anamorphic | 4.1 | 11.7 | 0.8 | 0.37 | 1.06 | 0.074 | 1.6 |
| Example 5 | anamorphic | 4.2 | 12.0 | 0.8 | 0.37 | 1.06 | 0.074 | 1.6 |
| Example 6 | anamorphic | 4.5 | 12.8 | 0.8 | 0.37 | 1.06 | 0.074 | 1.6 |
| Example 7 | torus | 29.5 | 84.2 | 5.9 | 11.00 | 31.43 | 2.200 | 1.6 |
| Example 8 | torus | 46.0 | 131.4 | 9.2 | 45.60 | 130.29 | 9.120 | 1.6 |
| Example 9 | torus | 52.1 | 148.9 | 10.4 | 82.57 | 235.91 | 16.514 | 1.6 |
| Comparative example 4 | anamorphic | 3.8 | 10.8 | 0.8 | 0.27 | 0.77 | 0.054 | 1.00 |
| Example 10 | anamorphic | 3.5 | 9.9 | 0.7 | 0.23 | 0.66 | 0.046 | 1.05 |
| Example 11 | anamorphic | 3.6 | 10.2 | 0.7 | 0.25 | 0.71 | 0.050 | 1.07 |
| Example 12 | anamorphic | 3.4 | 9.8 | 0.7 | 0.22 | 0.63 | 0.044 | 1.10 |
| Example 13 | anamorphic | 6.6 | 18.9 | 1.3 | 0.93 | 2.66 | 0.186 | 33.0 |
| Example 14 | anamorphic | 1.4 | 4.0 | 0.3 | 0.04 | 0.11 | 0.008 | 100.0 |
| Example 15 | torus | 6.2 | 1.2 | 17.7 | 0.57 | 0.71 | 10.100 | 35.0 |

As shown in Table 1 and Table 2, it is understood that the light diffuser plates according to Examples 1 to 15 all have ALCR larger than 1, so that anisotropy of diffused light is controlled. On the other hand, it is understood that in the light diffuser plates according to Comparative examples 1 to 3, diffused light is isotropic, and a diffraction component is included in diffused light to a visible degree because of the hexagonal close-packed structure.

In addition, in the light diffuser plates according to Examples 1 to 15, the magnitude of the optical phase difference component $\Psi$ with respect to light having the minimum wavelength of 0.35 μm and the magnitude of the optical phase difference component $\Psi$ with respect to light having the maximum wavelength of 2 μm are small, and the magnitude of the phase difference dispersion $\sigma(\Psi)$ with respect to light having the minimum wavelength of 0.35 μm and the magnitude of the phase difference dispersion σ(Ψ) with respect to light having the maximum wavelength of 2 μm are also small. Therefore, it is understood that in the light diffuser plates according to Examples 1 to 15, homogeneity of diffused distributed light is high, and a diffracted light component included in the diffused distributed light is extremely small. In the light diffuser plate according to the present embodiment, the optical phase difference components Ψ with respect to light having the minimum wavelength of 0.35 μm and light having the maximum wavelength of 2 μm preferably are less than 150. In addition, in the light diffuser plate according to the present embodiment, the phase difference dispersions σ(Ψ) with respect to light having the minimum wavelength of 0.35 μm and light having the maximum wavelength of 2 μm preferably are less than 200. Note that the lower limits of the optical phase difference components and the phase difference dispersions σ(Ψ) are not particularly limited, but are larger than 0 because of the configuration of the light diffuser plate.

Herein, FIG. 15A, FIG. 15B, FIG. 15C and FIG. 15D respectively illustrate a laser microscopic image (50×) of the light diffuser plate according to Example 1, a simulation result of light distribution obtained by an electromagnetic field analysis, a laser light distribution image, and a graph of luminance light distribution.

Figure 15A:
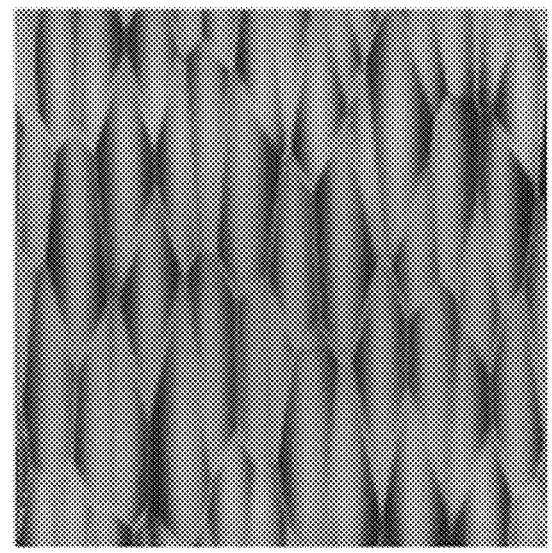
FIG. 15A is a laser microscopic image of a light diffuser plate according to Example 1.
Figure 15B:
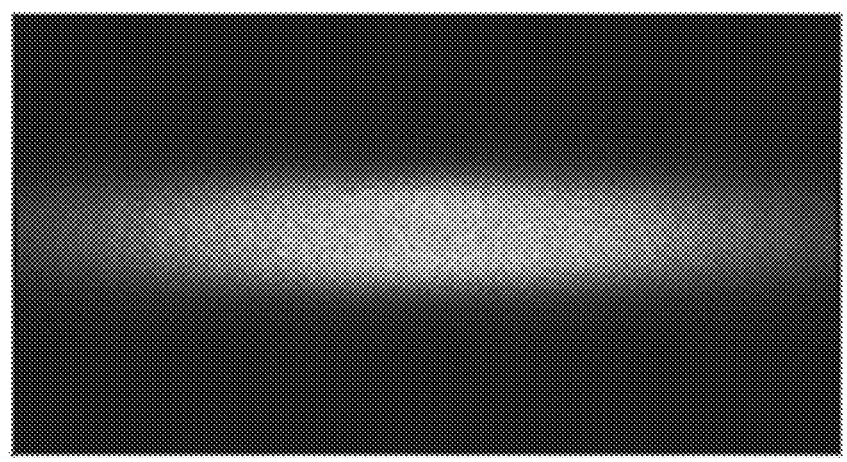
FIG. 15B illustrates a simulation result of light distribution obtained by an electromagnetic field analysis on the light diffuser plate according to Example 1.
Figure 15C:
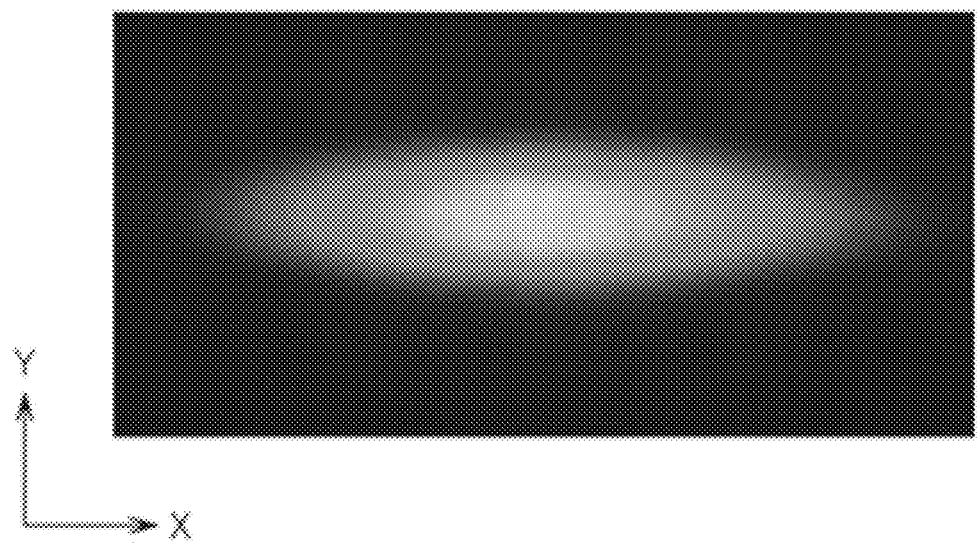
FIG. 15C illustrates a laser light distribution image of the light diffuser plate according to Example 1.
Figure 15D:
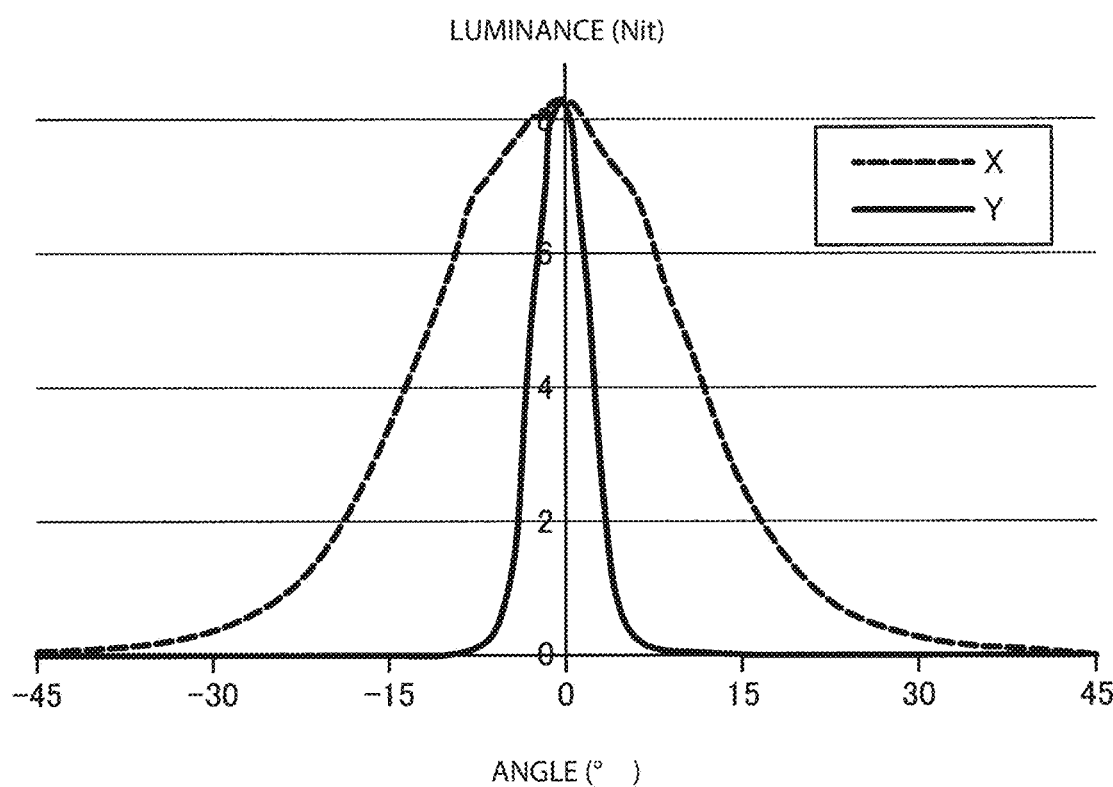
FIG. 15D is a graph of luminance light distribution according to Example 1.

As illustrated in FIG. 15A, it is understood that in the light diffuser plate according to Example 1, anamorphic lens-shaped convexities having anisotropy are arranged finely and randomly. As illustrated in FIG. 15B to FIG. 15D, it is also understood that in the light diffuser plate according to Example 1, control is exerted such that diffused light has high homogeneity, and the light distribution angle has anisotropy. Note that ALCR is obtained by calculating a ratio between the half widths of peaks in the X direction and the Y direction in the graph illustrated in FIG. 15D.

FIG. 16A, FIG. 16B, FIG. 16C and FIG. 16D respectively illustrate a laser microscopic image (50×) of the light diffuser plate according to Example 2, a simulation result of light distribution obtained by an electromagnetic field analysis, a laser light distribution image, and a graph of luminance light distribution.

Figure 16A:
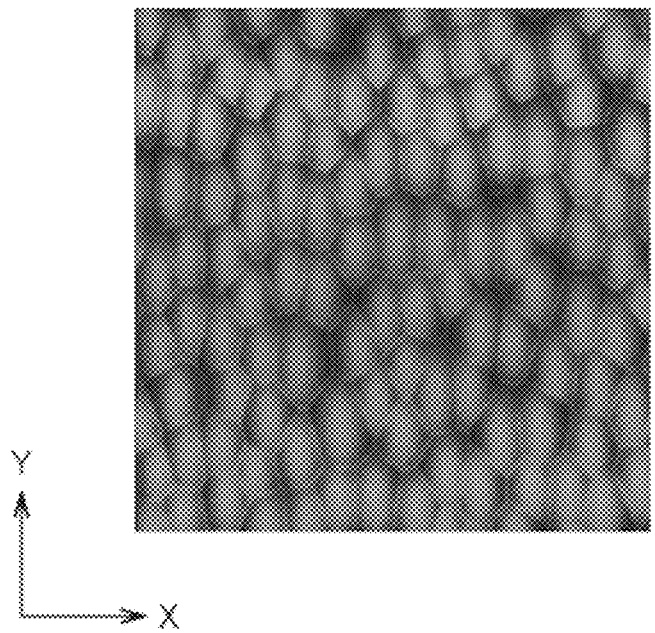
FIG. 16A illustrates a laser microscopic image of a light diffuser plate according to Example 2.
Figure 16B:
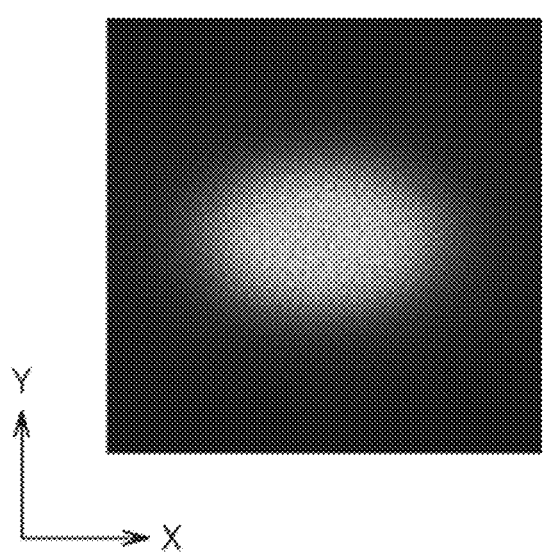
FIG. 16B illustrates a simulation result of light distribution obtained by an electromagnetic field analysis on the light diffuser plate according to Example 2.
Figure 16C:
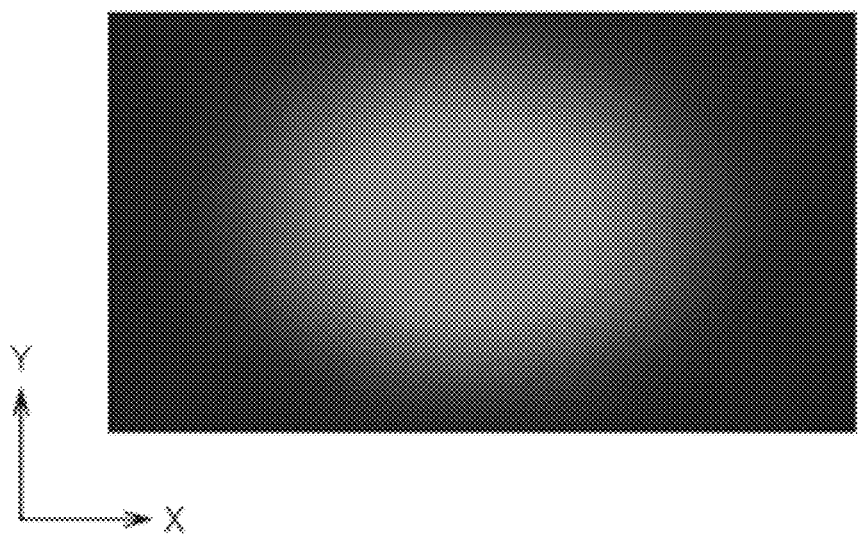
FIG. 16C illustrates a laser light distribution image of the light diffuser plate according to Example 2.
Figure 16D:
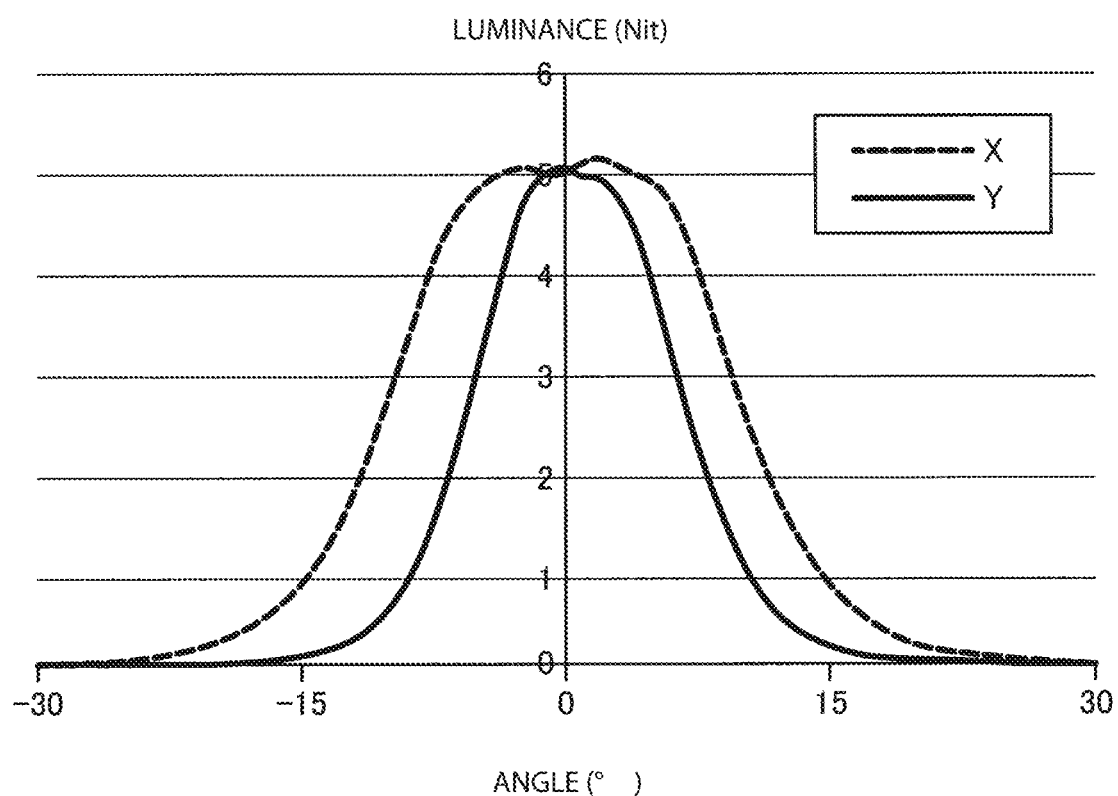
FIG. 16D is a graph of luminance light distribution according to Example 2.

As illustrated in FIG. 16A, it is understood that in the light diffuser plate according to Example 2, torus lens-shaped convexities having anisotropy are arranged finely and randomly. As illustrated in FIG. 16B to FIG. 16D, it is also understood that in the light diffuser plate according to Example 2, control is exerted such that diffused light has high homogeneity, and the light distribution angle has anisotropy.

FIG. 17A, FIG. 17B, FIG. 17C and FIG. 17D respectively illustrate a laser microscopic image (50×) of the light diffuser plate according to Example 3, a simulation result of light distribution obtained by an electromagnetic field analysis, a laser light distribution image, and a graph of luminance light distribution.

Figure 17A:
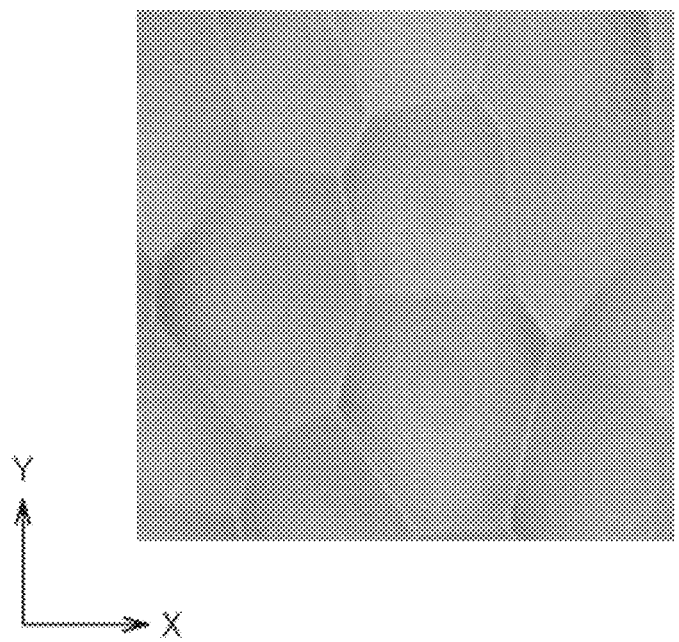
FIG. 17A is a laser microscopic image of a light diffuser plate according to Example 3.
Figure 17B:
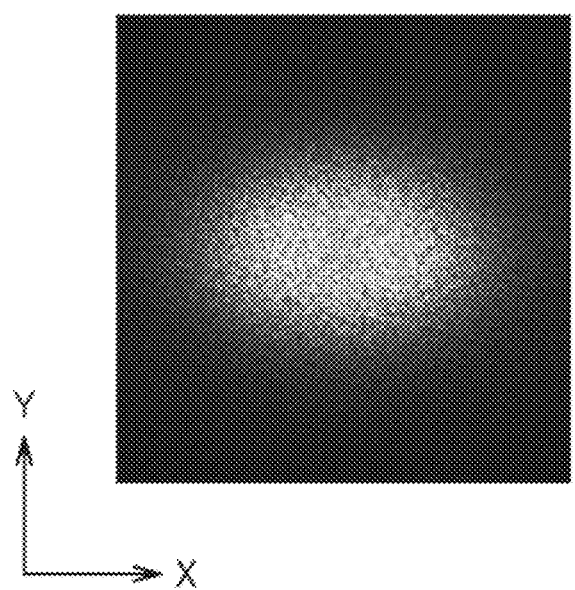
FIG. 17B illustrates a simulation result of light distribution obtained by an electromagnetic field analysis on the light diffuser plate according to Example 3.
Figure 17C:
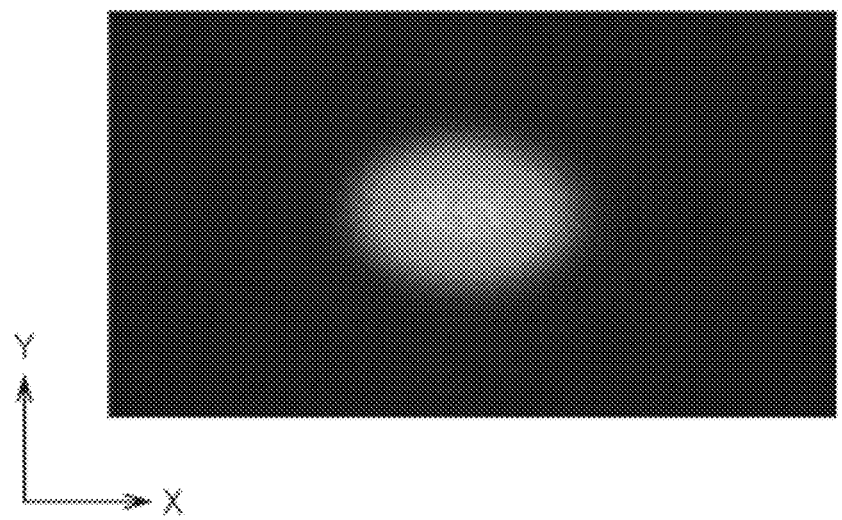
FIG. 17C illustrates a laser light distribution image of the light diffuser plate according to Example 3.
Figure 17D:
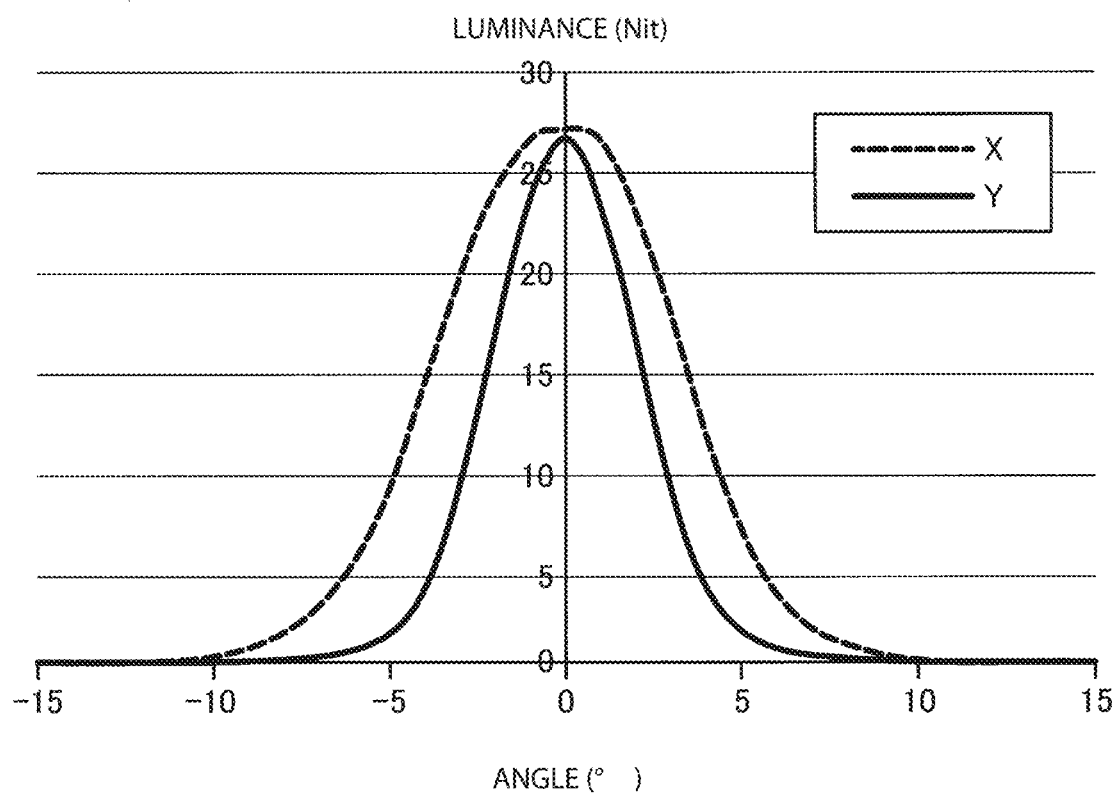
FIG. 17D is a graph of luminance light distribution according to Example 3.

As illustrated in FIG. 17A, it is understood that in the light diffuser plate according to Example 3, torus lens-shaped convexities having anisotropy are arranged finely and randomly. As illustrated in FIG. 17B to FIG. 17D, it is also understood that in the light diffuser plate according to Example 3, control is exerted such that diffused light has high homogeneity, and the light distribution angle has anisotropy.

Figure 18:
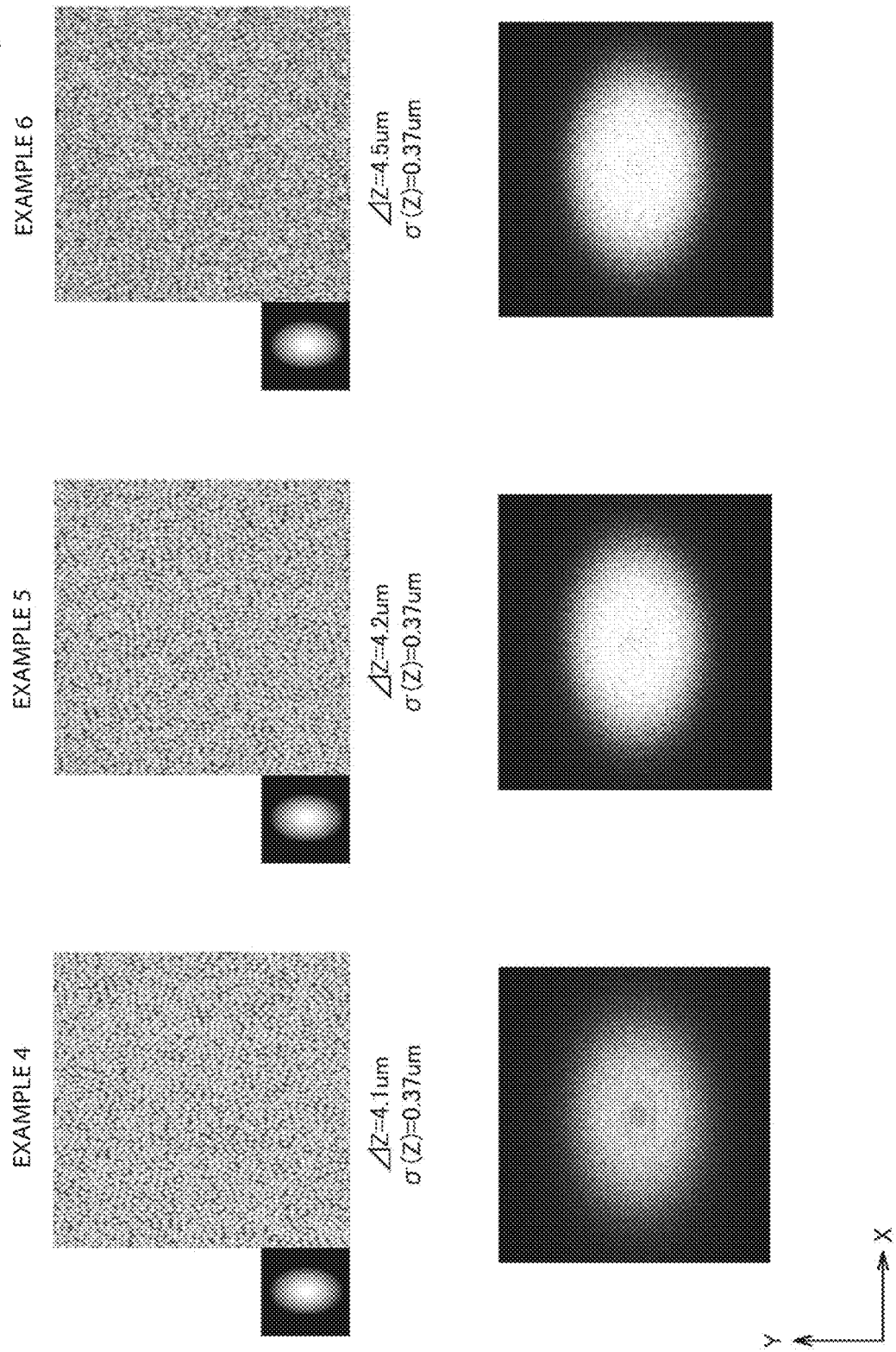
FIG. 18 illustrates images of generated pattern data of light diffuser plates according to Examples 4 to 6, and simulation results of light distribution obtained by electromagnetic field analyses.

FIG. 18 illustrates images (BMP) of generated pattern data of the light diffuser plates according to Examples 4 to 6 and simulation results of light distribution obtained by electromagnetic field analyses. In FIG. 18, the images (BMP) of generated pattern data of the light diffuser plates are shown on the upper side, and the simulation results of light distribution obtained by electromagnetic field analyses are shown on the lower side.

As illustrated in FIG. 18, it is understood that in the light diffuser plates according to Examples 4 to 6, diffused light has higher homogeneity as the perturbation rate increases. In particular, it is understood that in a case where the perturbation rate is more than or equal to 3% (Examples 5 and 6), diffused light has extremely high homogeneity, so that a diffraction pattern is no longer visually recognized in the diffused light.

Figure 19:
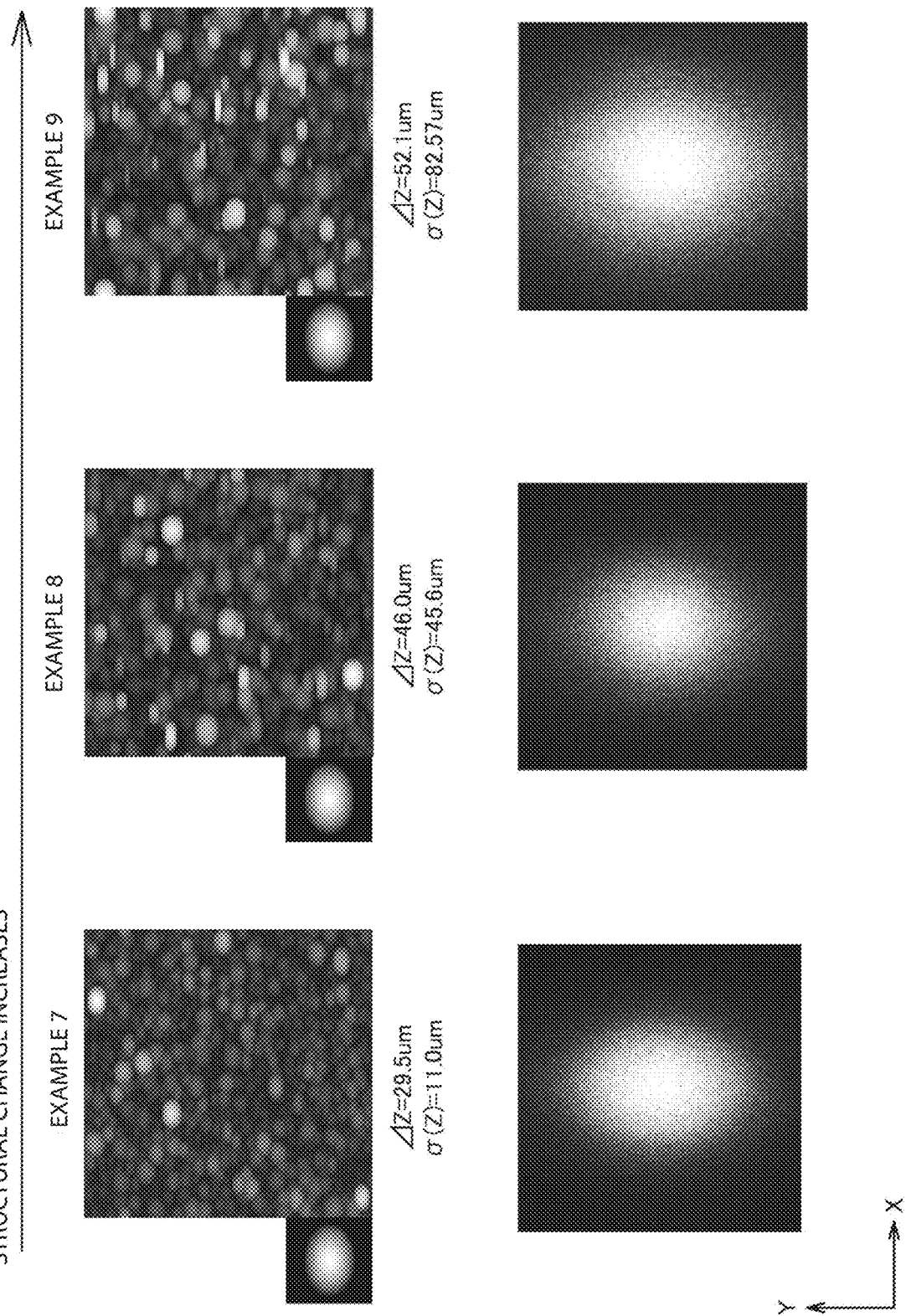
FIG. 19 illustrates images of generated pattern data of light diffuser plates according to Examples 7 to 9, and simulation results of light distribution obtained by electromagnetic field analyses.

FIG. 19 illustrates images (BMP) of generated pattern data of the light diffuser plates according to Examples 7 to 9 and simulation results of light distribution obtained by electromagnetic field analyses. In FIG. 19, the images (BMP) of generated pattern data of the light diffuser plates are shown on the upper side, and the simulation results of light distribution obtained by electromagnetic field analyses are shown on the lower side.

As illustrated in FIG. 19, it is understood that in the light diffuser plates according to Examples 7 to 9, an excessive increase of the perturbation rate makes diffused light uneven. In particular, it is understood that in a case where the perturbation rate is more than or equal to 85% (Example 9), unevenness of diffused light increases to a visible degree.

Figure 20:
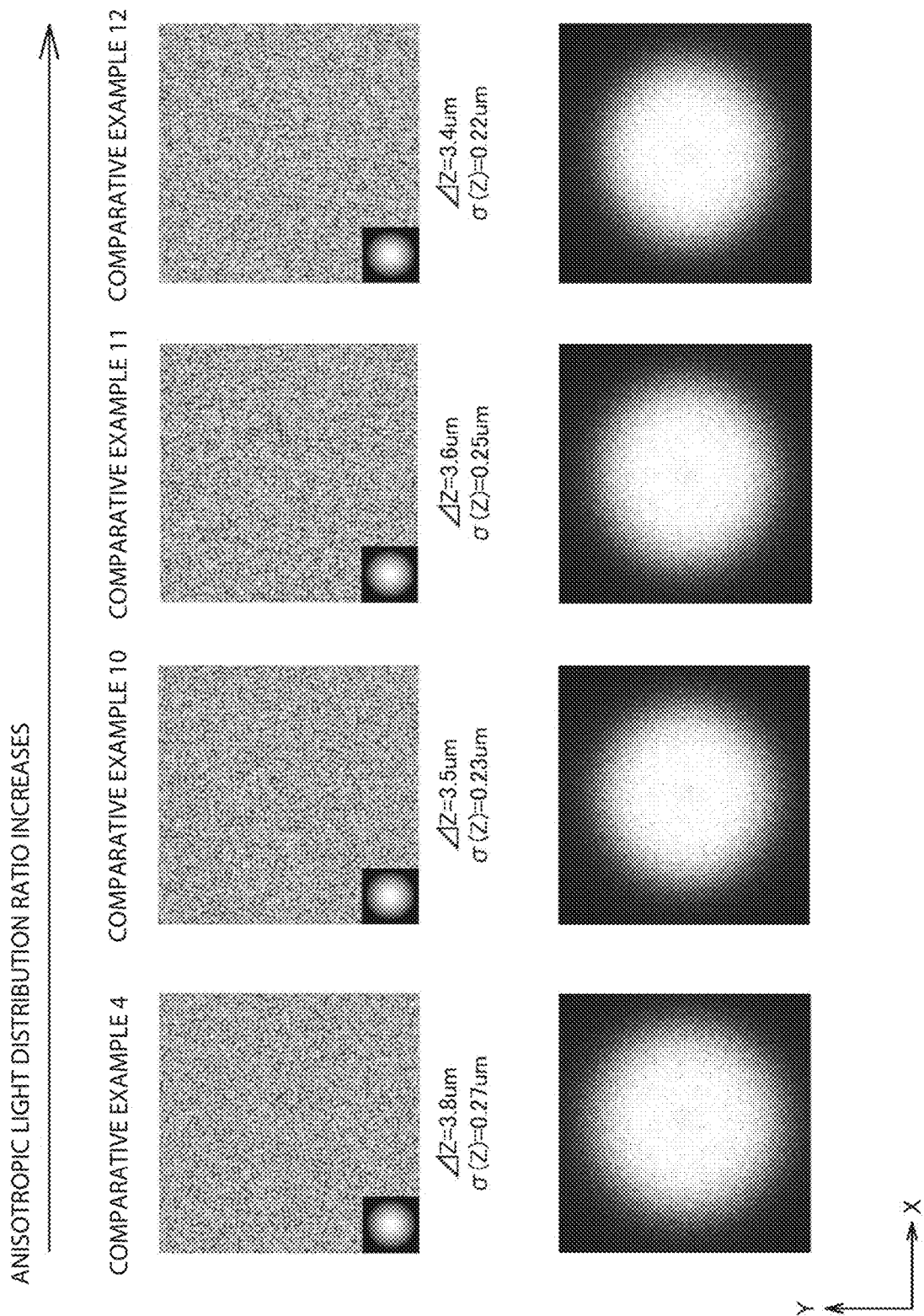
FIG. 20 illustrates images of generated pattern data of light diffuser plates according to Comparative example 4 and Examples 10 to 12, and simulation results of light distribution obtained by electromagnetic field analyses.

FIG. 20 illustrates images (BMP) of generated pattern data of the light diffuser plates according to Comparative example 4 and Examples 10 to 12, and simulation results of light distribution obtained by electromagnetic field analyses. In FIG. 20, the images (BMP) of generated pattern data of the light diffuser plates are shown on the upper side, and the simulation results of light distribution obtained by electromagnetic field analyses are shown on the lower side.

As illustrated in FIG. 20, it is understood that in the light diffuser plate according to Comparative example 4, since the convexities have isotropic shapes without anisotropy, diffused light also has an isotropic shape. On the other hand, it is understood that in the light diffuser plates according to Examples 10 to 12, since the convexities have anisotropic shapes, ALCR becomes more than or equal to 1.05, and diffused light has anisotropy. It is also understood that, as the anisotropy of the convexities increases, the anisotropy of diffused light also increases.

FIG. 21 illustrates images (BMP) of generated pattern data of the light diffuser plates according to Comparative examples 1 to 3, and simulation results of light distribution obtained by electromagnetic field analyses. In FIG. 21, the images (BMP) of generated pattern data of the light diffuser plates are shown on the upper side, and the simulation results of light distribution obtained by electromagnetic field analyses are shown on the lower side.

As illustrated in FIG. 21, it is understood that in the light diffuser plates according to Comparative examples 1 to 3, since the convexities have isotropic shapes, diffused light is also isotropic. It is also understood that in the light diffuser plates according to Comparative examples 1 to 3, a diffraction component is included in diffused light to a visible degree because of the hexagonal close-packed arrangement of the convexities.

Figure 22A:
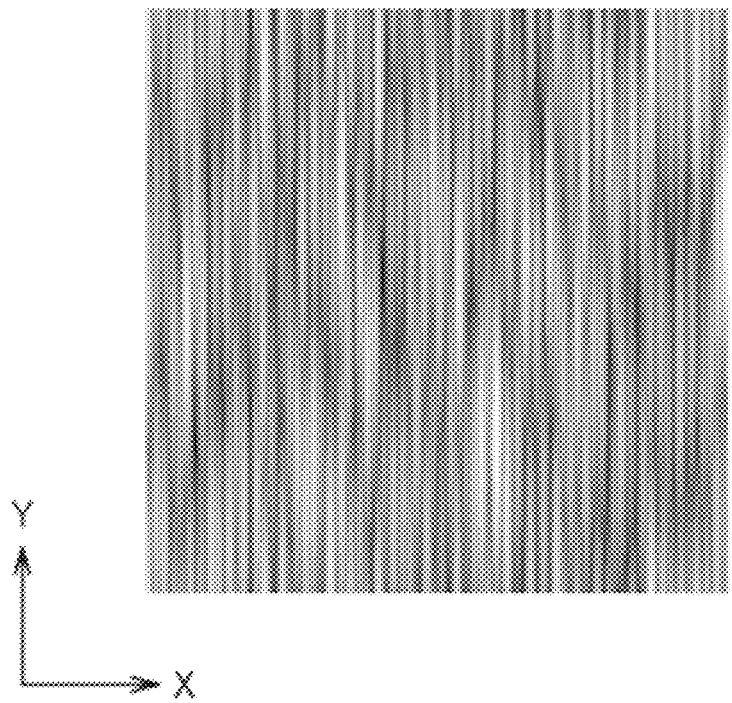
FIG. 22A illustrates an image of generated pattern data of a light diffuser plate according to Example 13.
Figure 22B:
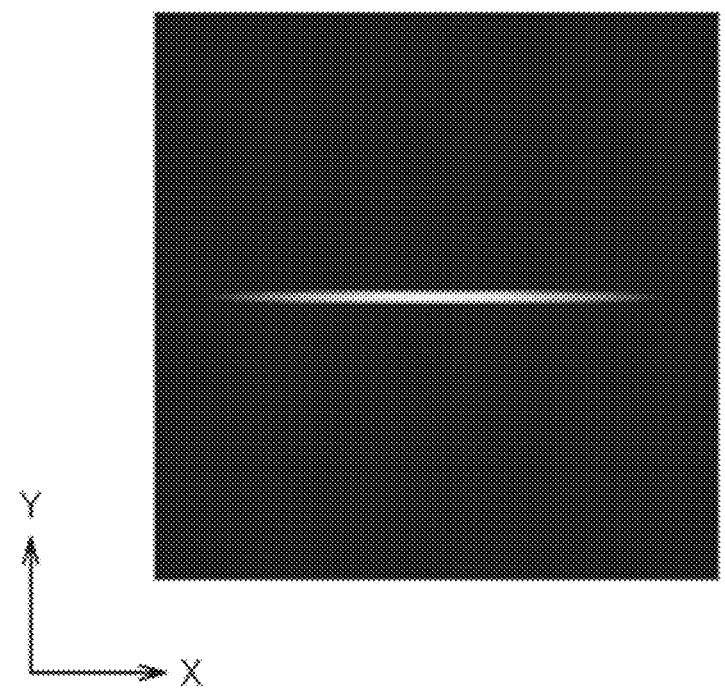
FIG. 22B illustrates a laser light distribution image of the light diffuser plate according to Example 13.
Figure 22C:
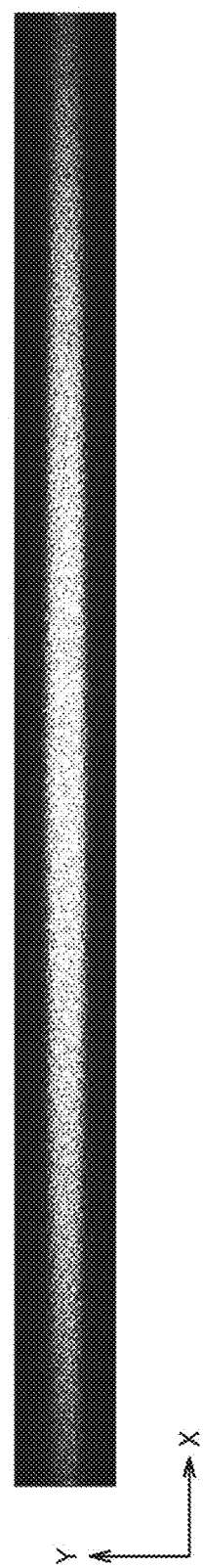
FIG. 22C illustrates a simulation result of light distribution obtained by an electromagnetic field analysis on the light diffuser plate according to Example 13.

FIG. 22A, FIG. 22B and FIG. 22C respectively illustrate an image (BMP) of generated pattern data of the light diffuser plate according to Example 13, a laser light distribution image, and a simulation result of light distribution obtained by an electromagnetic field analysis.

As illustrated in FIG. 22A, it is understood that in the light diffuser plate according to Example 13, convexities having extremely high anisotropy are arranged finely and randomly. As illustrated in FIG. 22B and FIG. 22C, it is also understood that in the light diffuser plate according to Example 13, even in the case where the convexities have such extremely high anisotropy, the anisotropy of diffused light can be controlled.

Figure 23A:
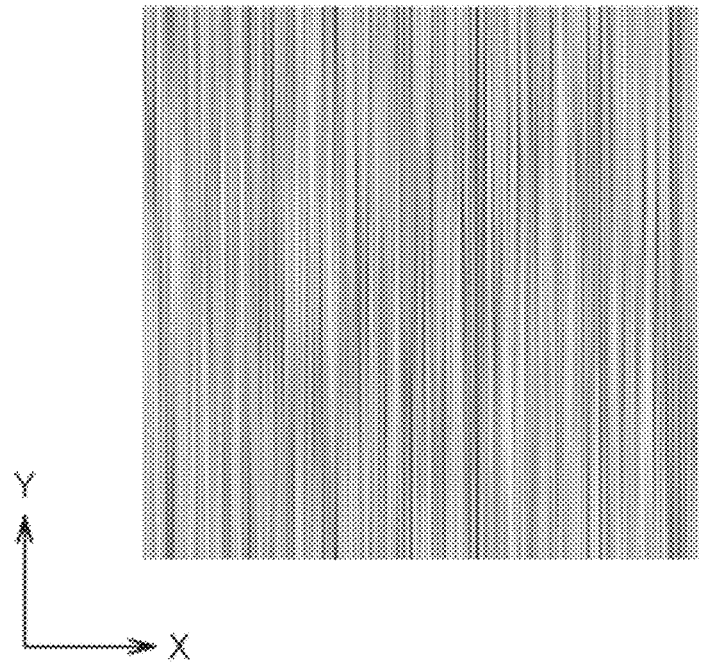
FIG. 23A illustrates an image of generated pattern data of a light diffuser plate according to Example 14.
Figure 23B:
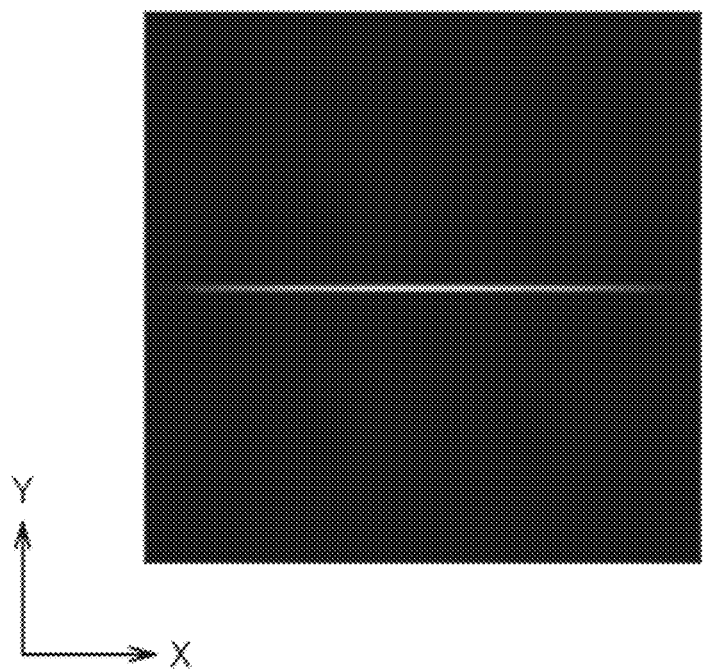
FIG. 23B illustrates a laser light distribution image of the light diffuser plate according to Example 14.
Figure 23C:
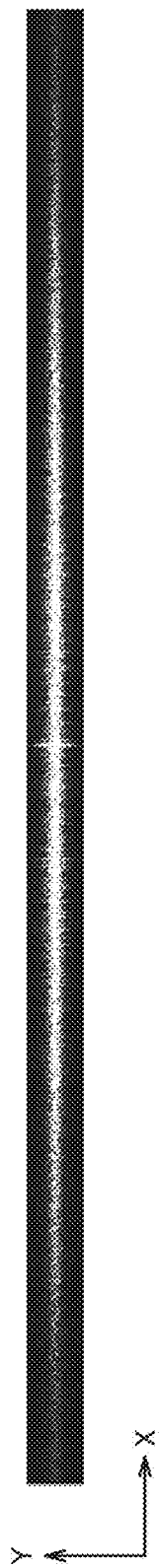
FIG. 23C illustrates a simulation result of light distribution obtained by an electromagnetic field analysis on the light diffuser plate according to Example 14.

FIG. 23A, FIG. 23B and FIG. 23C respectively illustrate an image (BMP) of generated pattern data of the light diffuser plate according to Example 14, a laser light distribution image, and a simulation result of light distribution obtained by an electromagnetic field analysis.

As illustrated in FIG. 23A, it is understood that in the light diffuser plate according to Example 14, convexities having extremely high anisotropy are arranged finely and randomly. As illustrated in FIG. 23B and FIG. 23C, it is also understood that in the light diffuser plate according to Example 14, even in the case where the convexities have such extremely high anisotropy, the anisotropy of diffused light can be controlled.

FIG. 24A, FIG. 24B, FIG. 24C and FIG. 24D respectively illustrate an image (BMP) of generated pattern data of the light diffuser plate according to Example 15, a simulation result of light distribution obtained by an electromagnetic field analysis, a laser light distribution image, and a graph of luminance light distribution.

Figure 24A:
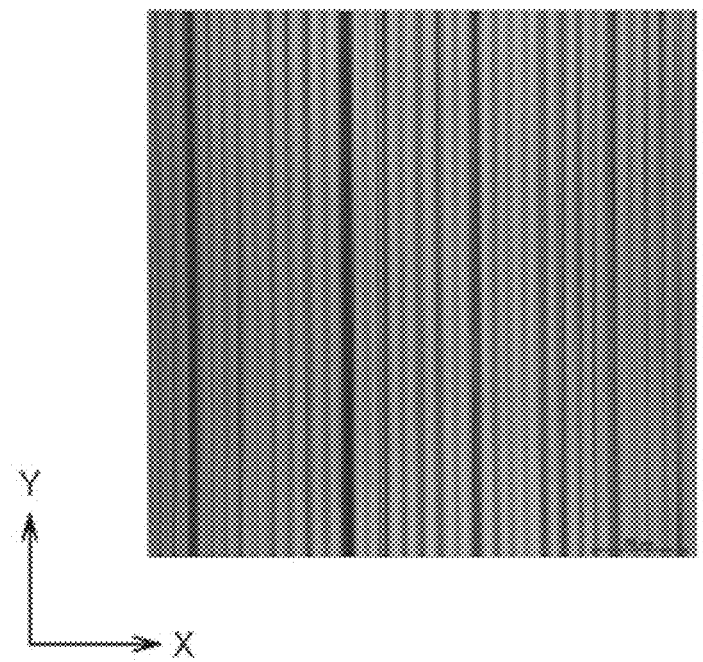
FIG. 24A illustrates an image of generated pattern data of a light diffuser plate according to Example 15.
Figure 24B:
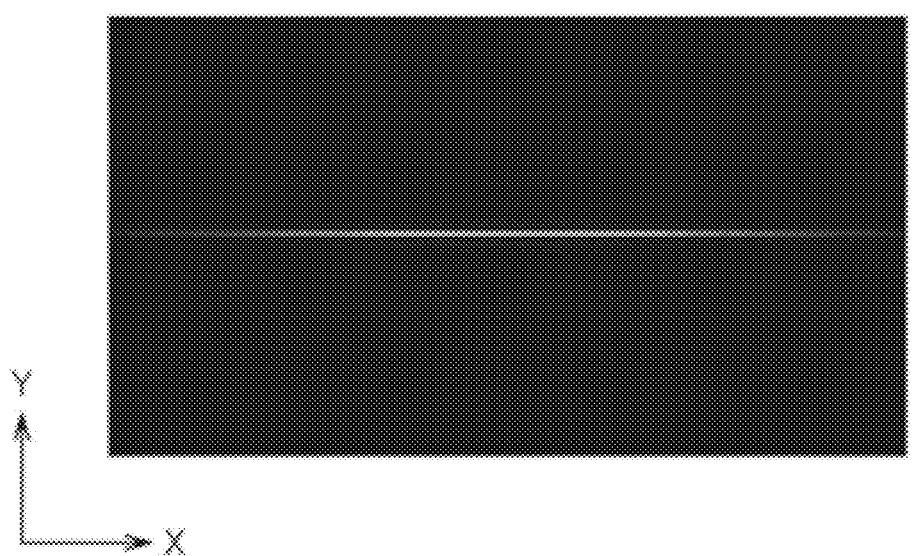
FIG. 24B illustrates a simulation result of light distribution obtained by an electromagnetic field analysis on the light diffuser plate according to Example 15.
Figure 24C:
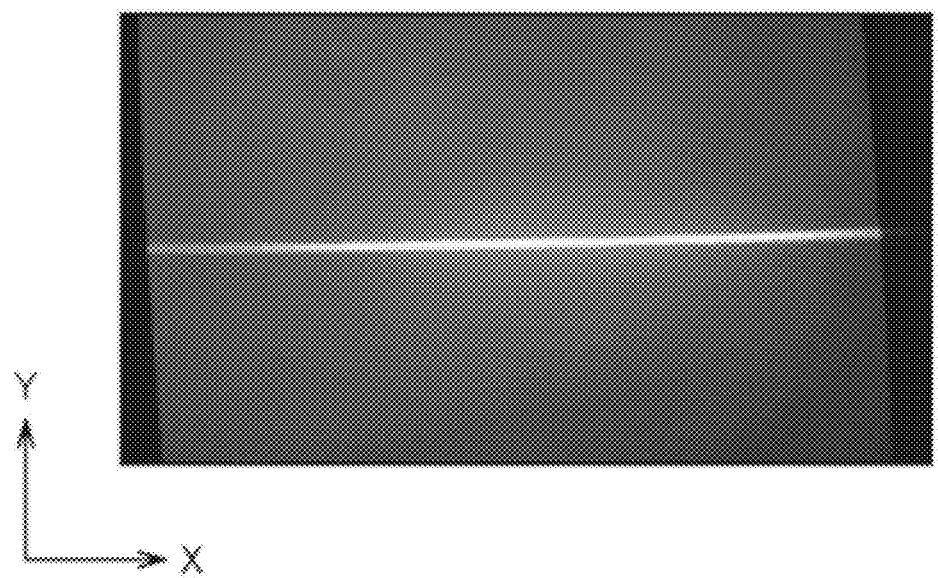
FIG. 24C illustrates a laser light distribution image of the light diffuser plate according to Example 15.
Figure 24D:
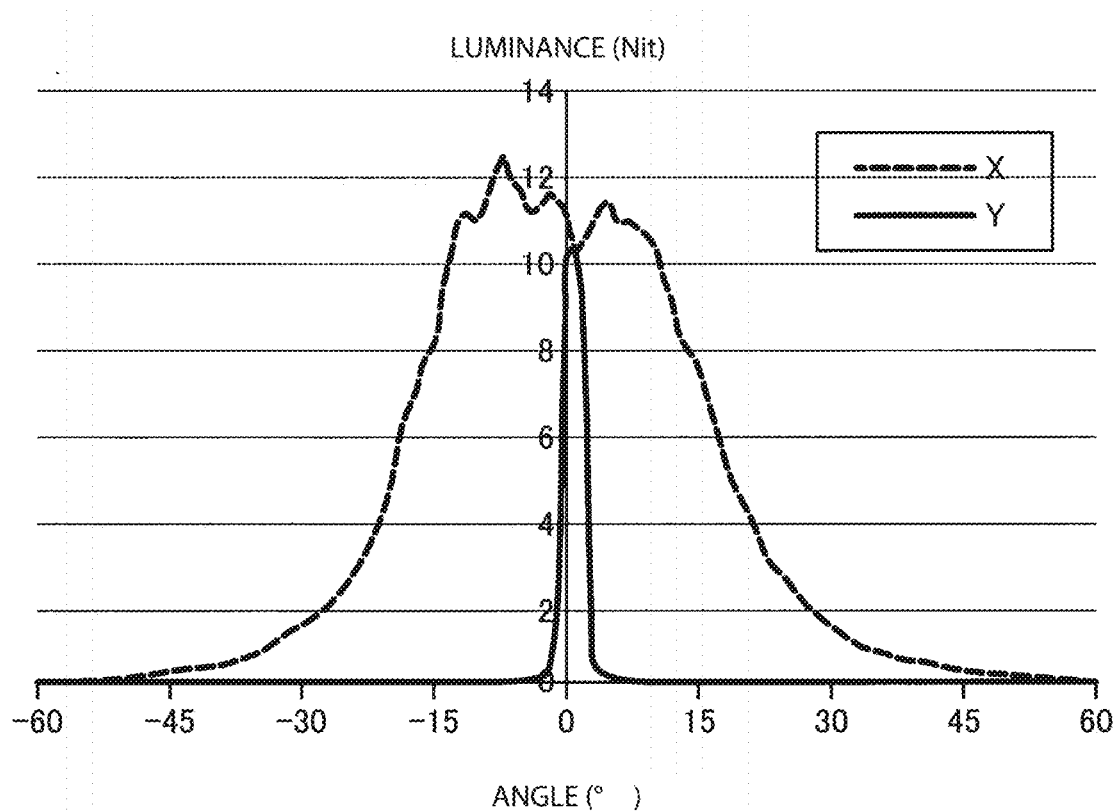
FIG. 24D is a graph of luminance light distribution according to Example 15.

As illustrated in FIG. 24A, it is understood that in the light diffuser plate according to Example 15, convexities having extremely high anisotropy are arranged finely and randomly. As illustrated in FIG. 24B to FIG. 24D, it is also understood that in the light diffuser plate according to Example 15, even in the case where the convexities have such extremely high anisotropy, the anisotropy of diffused light can be controlled. In other words, it is understood that the light diffuser plates according to Examples 13 to 15 enable diffused light to be distributed so as to have extremely high anisotropy even if the convexities have either an anamorphic lens shape or a torus lens shape.

As is understood from the light diffuser plates according to Examples 13 to 15, the upper limit of ALCR of the light diffuser plate according to the present embodiment is not particularly limited. However, from perspectives such as difficulty in manufacturing, the upper limit of ALCR of the light diffuser plate according to the present embodiment may be set at 500, for example.

The preferred embodiment(s) of the present invention has/have been described above in detail with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST

1 light diffuser plate
10 base material
20 group structure
21 convexity

The invention claimed is:
1. A light diffuser plate comprising:
a base material; and
a group structure including a plurality of convexities or concavities provided on at least one main surface of the base material and having anisotropic shapes extended in a common direction, wherein the plurality of convexities or concavities are arranged randomly and densely on the main surface of the base material,
a boundary between adjacent ones of the plurality of convexities or concavities includes a plurality of curved lines having curvatures different from each other,
an optical phase difference component $\Psi$ of the group structure with respect to light having a wavelength of more than or equal to 0.35 μm and less than or equal to 2 μm is less than 150, and
a filling rate of the convexities or concavities on the main surface of the base material is more than or equal to 90%, and
when an overlapping allowance Ov, which is an index representing an overlapping rate between the plurality of convexities or concavities, is expressed by following expressions (4) and (5), the overlapping allowance Ov is controlled to be more than 25% and less than 75%:

$$d = \sqrt{dx^2 + \left(\frac{b}{a}dy\right)^2} \qquad (4)$$

$$Ov = \frac{b-d}{b}, \qquad (5)$$

in which "a" is a diameter of an elliptical shape in a plan view of each of the convexities or concavities in a longer axis direction,
"b" is a diameter of the elliptical shape in a shorter axis direction,
"dx" and "dy" are differences between central coordinates of two elliptical shapes in a plan view of the convexities or concavities adjacent to each other, and
"d" is a center-to-center distance of the two elliptical shapes when compressing the two elliptical shapes in the longer axis direction for conversion into a circle.
2. The light diffuser plate according to claim 1, wherein surfaces of the convexities or concavities include curved surfaces.
3. The light diffuser plate according to claim 1, wherein surface shapes of the convexities or concavities are anamorphic shapes or torus shapes.
4. The light diffuser plate according to claim 1, wherein the plurality of convexities or concavities are arranged such that radii of curvature or opening sizes of curved surfaces of the plurality of convexities or concavities are perturbed from each other.
5. The light diffuser plate according to claim 1, wherein a phase difference dispersion $\sigma(\Psi)$ of the group structure with respect to light having a wavelength of more than or equal to 0.35 μm and less than or equal to 2 μm is less than 200.
6. The light diffuser plate according to claim 1, wherein when expressing a half width of a light distribution angle of the group structure in the extending direction of the anisotropic shapes by WL, and a half width of a light distribution angle of the group structure in a direction orthogonal to the extending direction by WO, WO/WL is more than or equal to 1.05.
7. The light diffuser plate according to claim 1, wherein the boundary between adjacent ones of the plurality of convexities or concavities has a width of less than or equal to 1 μm.
8. The light diffuser plate according to claim 4, wherein when expressing a perturbed amount of the radius of curvature of the curved surface of each of the plurality of convexities or concavities by ΔR, and a reference value of the radius of curvature of the curved surface by R, ΔR/R is more than or equal to 3% and less than or equal to 85%.

9. The light diffuser plate according to claim 4, wherein when expressing a perturbed amount of the opening size of each of the plurality of convexities or concavities by ΔD, and a reference value of the opening size by D, ΔD/D is more than or equal to 3% and less than or equal to 85%.

10. An image display device comprising:
a light diffuser plate mounted on an optical path from a light source, wherein
the light diffuser plate includes
a base material, and
a group structure including a plurality of convexities or concavities provided on at least one main surface of the base material and having anisotropic shapes extended in a common direction,
the plurality of convexities or concavities are arranged randomly and densely on the main surface of the base material, and
a boundary between adjacent ones of the plurality of convexities or concavities includes a plurality of curved lines having curvatures different from each other,
wherein an optical phase difference component Ψ of the group structure with respect to light having a wavelength of more than or equal to 0.35 μm and less than or equal to 2 μm is less than 150, and
a filling rate of the convexities or concavities on the main surface of the base material is more than or equal to 90%%, and
when an overlapping allowance Ov, which is an index representing an overlapping rate between the plurality of convexities or concavities, is expressed by following expressions (4) and (5), the overlapping allowance Ov is controlled to be more than 25% and less than 75%:

$$d = \sqrt{dx^2 + \left(\frac{b}{a}dy\right)^2} \quad (4)$$

$$Ov = \frac{b-d}{b}, \quad (5)$$

in which "a" is a diameter of an elliptical shape in a plan view of each of the convexities or concavities in a longer axis direction,
"b" is a diameter of the elliptical shape in a shorter axis direction,
"dx" and "dy" are differences between central coordinates of two elliptical shapes in a plan view of the convexities or concavities adjacent to each other, and
"d" is a center-to-center distance of the two elliptical shapes when compressing the two elliptical shapes in the longer axis direction for conversion into a circle.

11. A lighting device comprising:
a light diffuser plate mounted on a surface of a light source, wherein
the light diffuser plate includes
a base material, and a group structure including a plurality of convexities or concavities provided on at least one main surface of the base material and having anisotropic shapes extended in a common direction,
the plurality of convexities or concavities are arranged randomly and densely on the main surface of the base material, and
a boundary between adjacent ones of the plurality of convexities or concavities includes a plurality of curved lines having curvatures different from each other,
wherein an optical phase difference component Ψ of the group structure with respect to light having a wavelength of more than or equal to 0.35 μm and less than or equal to 2 μm is less than 150, and
a filling rate of the convexities or concavities on the main surface of the base material is more than or equal to 90%%, and
when an overlapping allowance Ov, which is an index representing an overlapping rate between the plurality of convexities or concavities, is expressed by following expressions (4) and (5), the overlapping allowance Ov is controlled to be more than 25% and less than 75%:

$$d = \sqrt{dx^2 + \left(\frac{b}{a}dy\right)^2} \quad (4)$$

$$Ov = \frac{b-d}{b}, \quad (5)$$

in which "a" is a diameter of an elliptical shape in a plan view of each of the convexities or concavities in a longer axis direction,
"b" is a diameter of the elliptical shape in a shorter axis direction,
"dx" and "dy" are differences between central coordinates of two elliptical shapes in a plan view of the convexities or concavities adjacent to each other, and
"d" is a center-to-center distance of the two elliptical shapes when compressing the two elliptical shapes in the longer axis direction for conversion into a circle.

* * * * *